United States Patent
Anich

(10) Patent No.: US 10,240,574 B1
(45) Date of Patent: Mar. 26, 2019

(54) SOLAR TRACKING AND SOLAR ENERGY COLLECTION APPARATUS AND METHOD OF USING

(71) Applicant: Phillip Rudolph Anich, Ashland, WI (US)

(72) Inventor: Phillip Rudolph Anich, Ashland, WI (US)

( * ) Notice: Subject to any disclaimer, the term of this patent is extended or adjusted under 35 U.S.C. 154(b) by 47 days.

(21) Appl. No.: 15/649,698

(22) Filed: Jul. 14, 2017

Related U.S. Application Data

(63) Continuation-in-part of application No. 14/280,584, filed on May 17, 2014, now Pat. No. 9,739,505.

(51) Int. Cl.
| | |
|---|---|
| F24J 2/38 | (2014.01) |
| F03B 13/06 | (2006.01) |
| H02S 20/32 | (2014.01) |
| F24S 23/30 | (2018.01) |
| F24S 25/70 | (2018.01) |
| F24S 30/428 | (2018.01) |
| F24S 30/00 | (2018.01) |

(52) U.S. Cl.
CPC ............ *F03B 13/06* (2013.01); *F24S 23/31* (2018.05); *F24S 25/70* (2018.05); *F24S 30/428* (2018.05); *H02S 20/32* (2014.12); *F24S 2030/115* (2018.05); *F24S 2030/18* (2018.05)

(58) Field of Classification Search
CPC .. F24J 2/08; F24J 2/5417; F24J 2/5431; F24J 2/542; F24J 2/524; F24J 2/5427; F24J 2/38; F24J 2/54–2/5413; F24J 2002/075; F24J 2002/5451; F24J 2002/5458; F24J 2002/5479; F24J 2/07; F24J 2/125; F24J 2/145; F24J 2/461; F24J 2/4638; F24J 2/506; F24J 2/52; F24J 2/523; F24J 2/5267; F24J 2/5406; F24J 2/541; Y02E 10/47; F03G 3/00; F03G 7/10; F03G 3/04; F03G 3/08; F03G 7/00; F03G 7/05
See application file for complete search history.

(56) References Cited

U.S. PATENT DOCUMENTS

| | | | |
|---|---|---|---|
| 3,977,773 | A | 8/1976 | Hubbard |
| 4,132,223 | A | 1/1979 | Reddell |
| 4,165,734 | A | 8/1979 | Schmidt |
| 4,172,443 | A | 10/1979 | Sommer |
| 4,194,492 | A | 3/1980 | Tremblay |
| 4,220,136 | A | 9/1980 | Penney |
| 4,249,511 | A | 2/1981 | Krisst et al. |
| 4,352,350 | A | 10/1982 | Johnson |

(Continued)

OTHER PUBLICATIONS

David Gordon Wilson, Development and Optimization of a Thermal-Storage Solar Cooker, MIT Room 3-256, Cambridge, MA 02139, Undated, US Publication.

*Primary Examiner* — Jason Lau
(74) *Attorney, Agent, or Firm* — Richard C. Emery

(57) ABSTRACT

The invention is directed to a solar tracking apparatus containing a polar axis aligned shaft which rotates continuously or intermittently at a rate simulating the apparent approximate fifteen degree per hour movement of the sun across the sky. A Fresnel lens, photovoltaic panel, parabolic dish or other solar collection/concentration device is adjustably mounted to about twenty three degrees either side of perpendicular to the axis of the shaft and directly at the Sun, collecting, focusing or concentrating the solar radiation on a receiving device, which stores the solar energy in the form of heat, re-directs the light or converts the energy into electricity.

17 Claims, 24 Drawing Sheets

(56) References Cited

U.S. PATENT DOCUMENTS

| | | |
|---|---|---|
| 4,546,756 A | 10/1985 | Leroy et al. |
| 5,275,149 A | 1/1994 | Ludlow |
| 5,632,823 A | 5/1997 | Sharan |
| 6,284,968 B1 | 9/2001 | Niesyn |
| 7,797,932 B2 | 9/2010 | Green |
| 8,151,787 B1 | 4/2012 | Sivert |
| 8,322,332 B2 | 12/2012 | Rogers |
| 2010/0326427 A1 | 12/2010 | Chen |

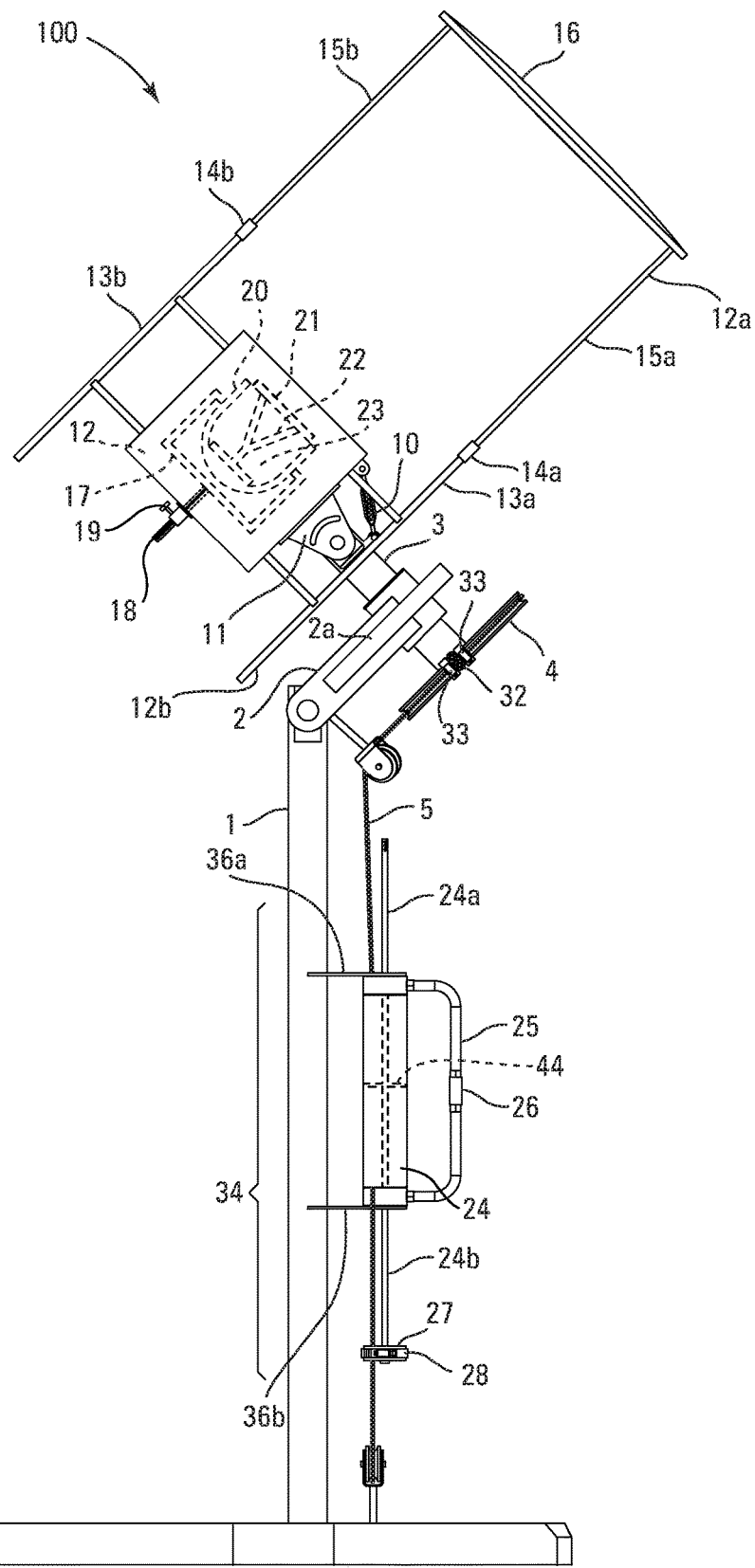

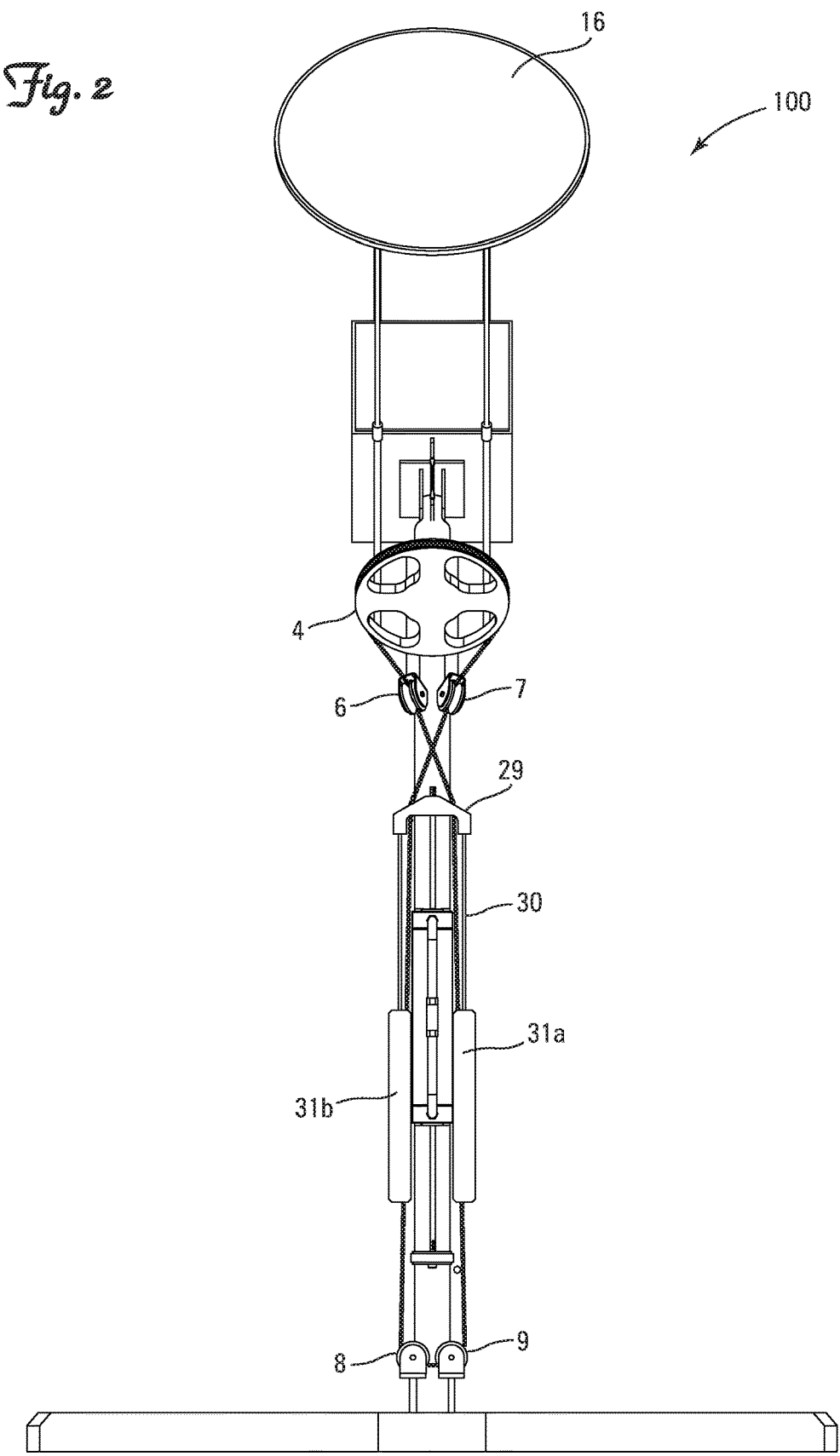

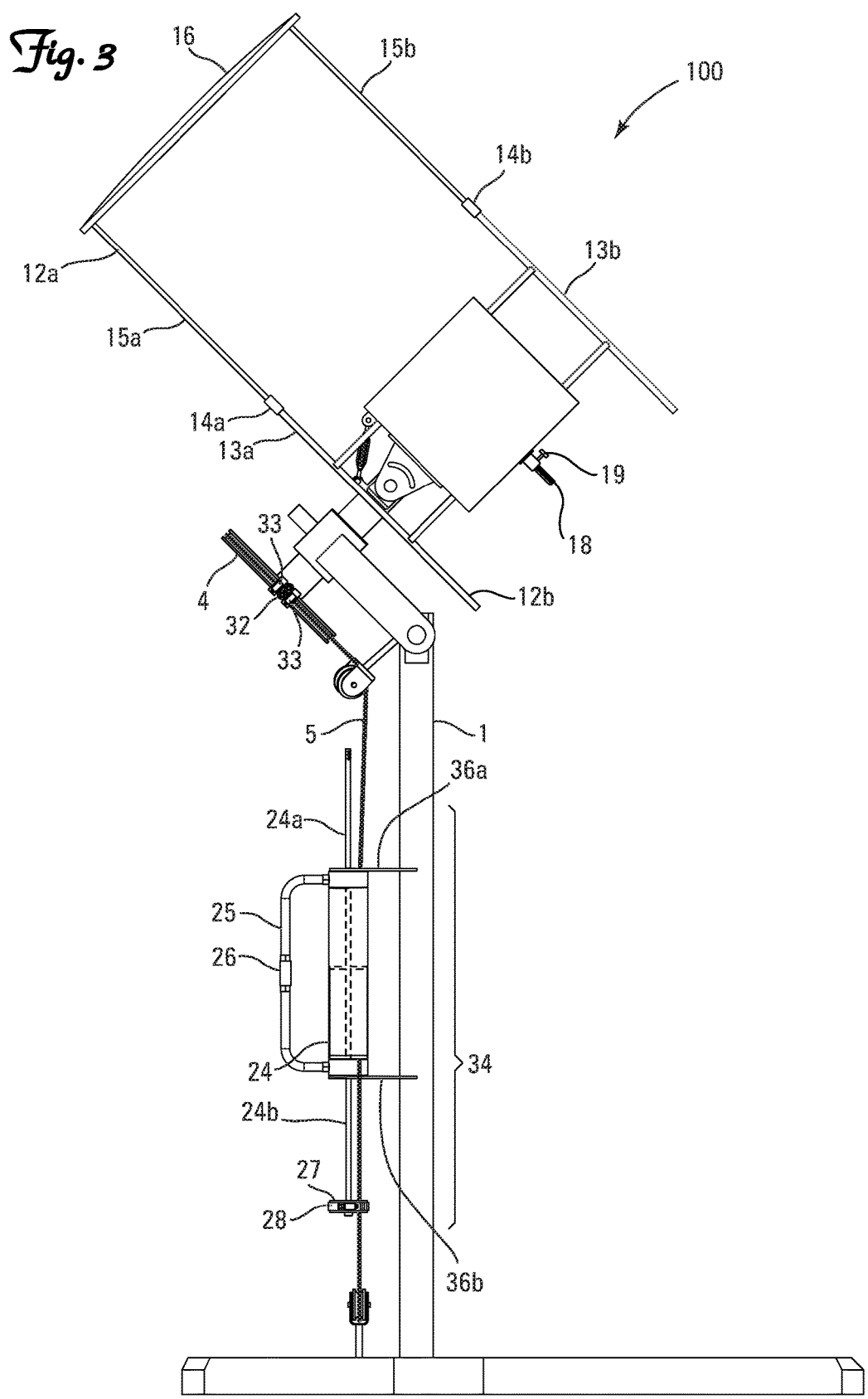

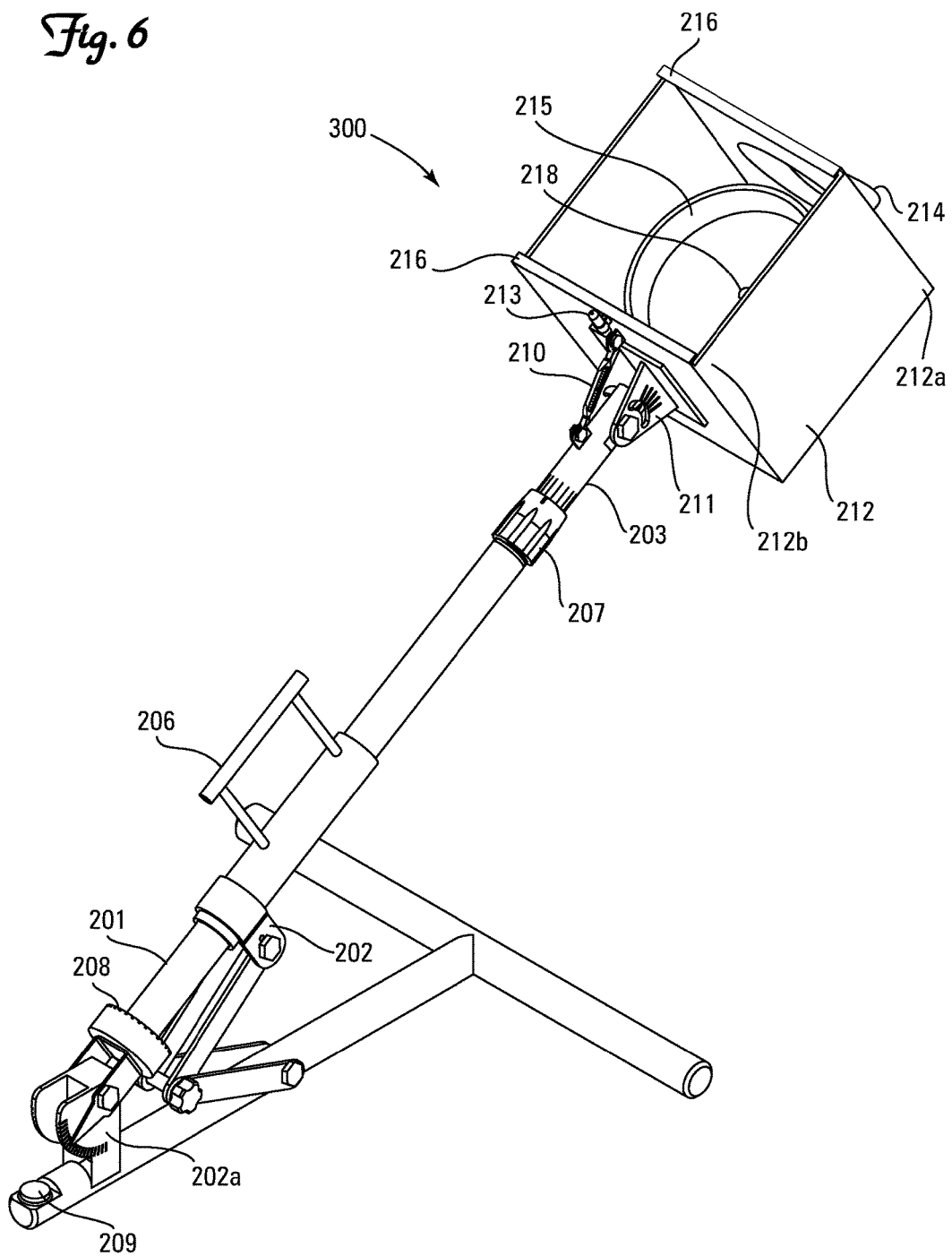

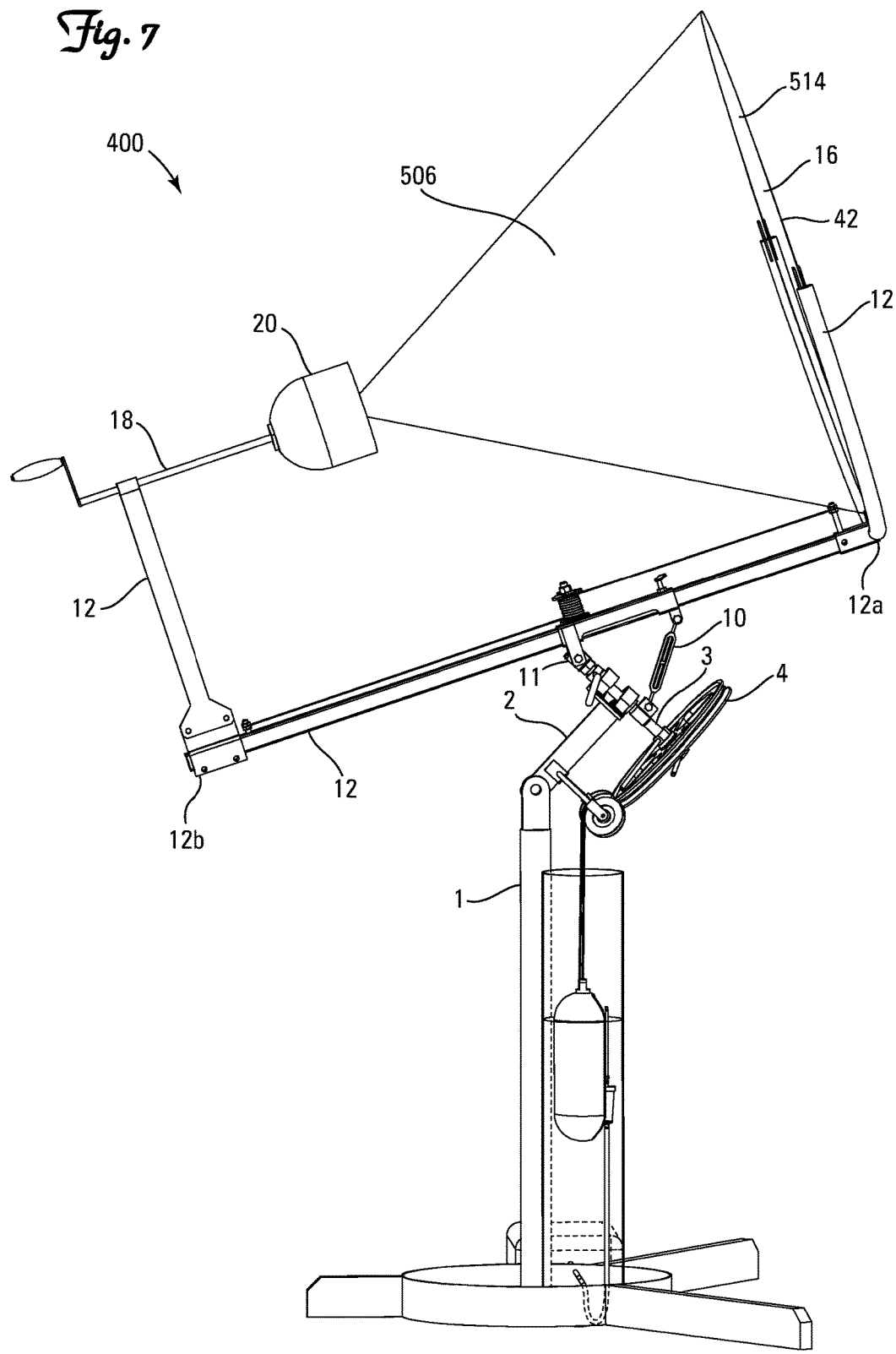

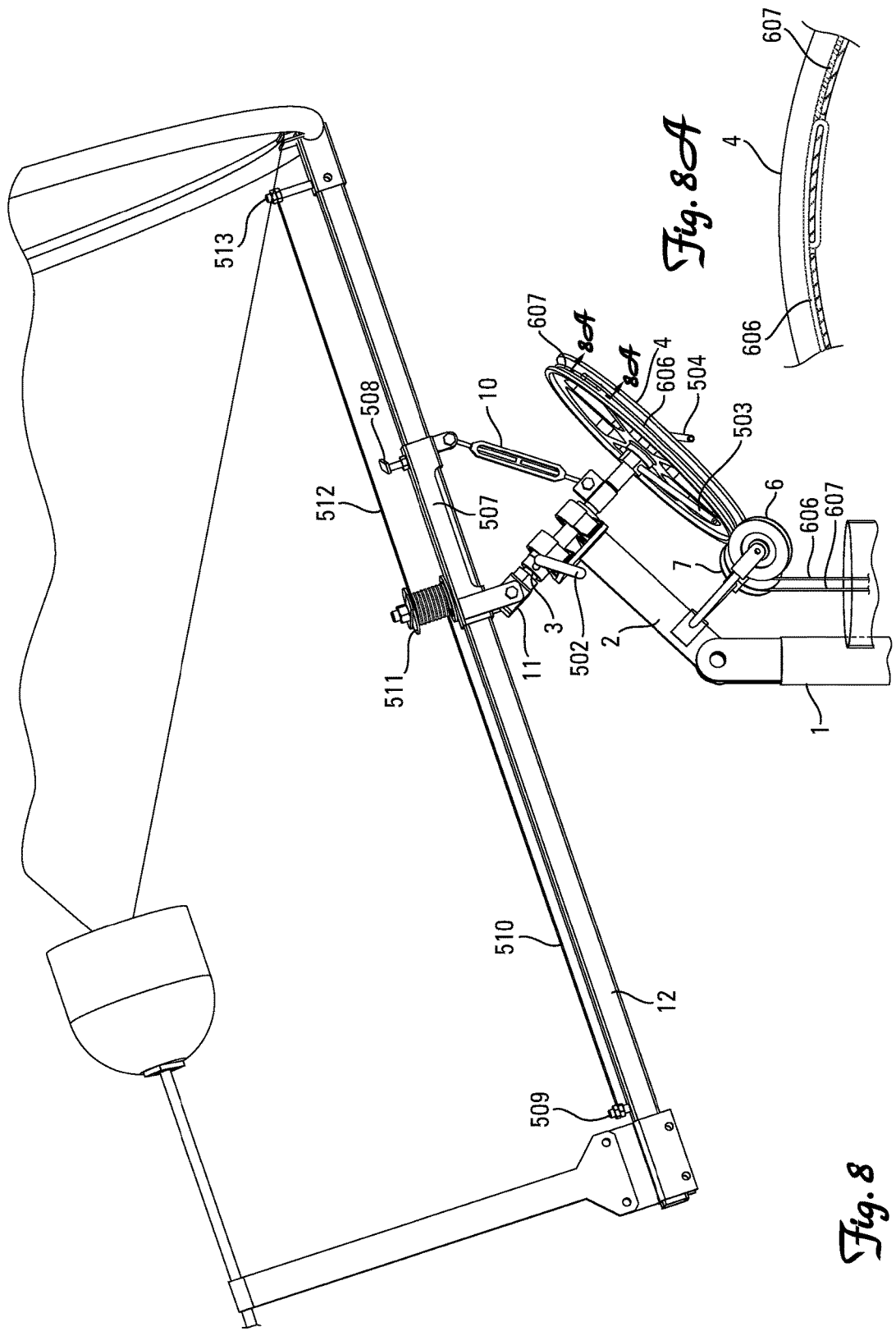

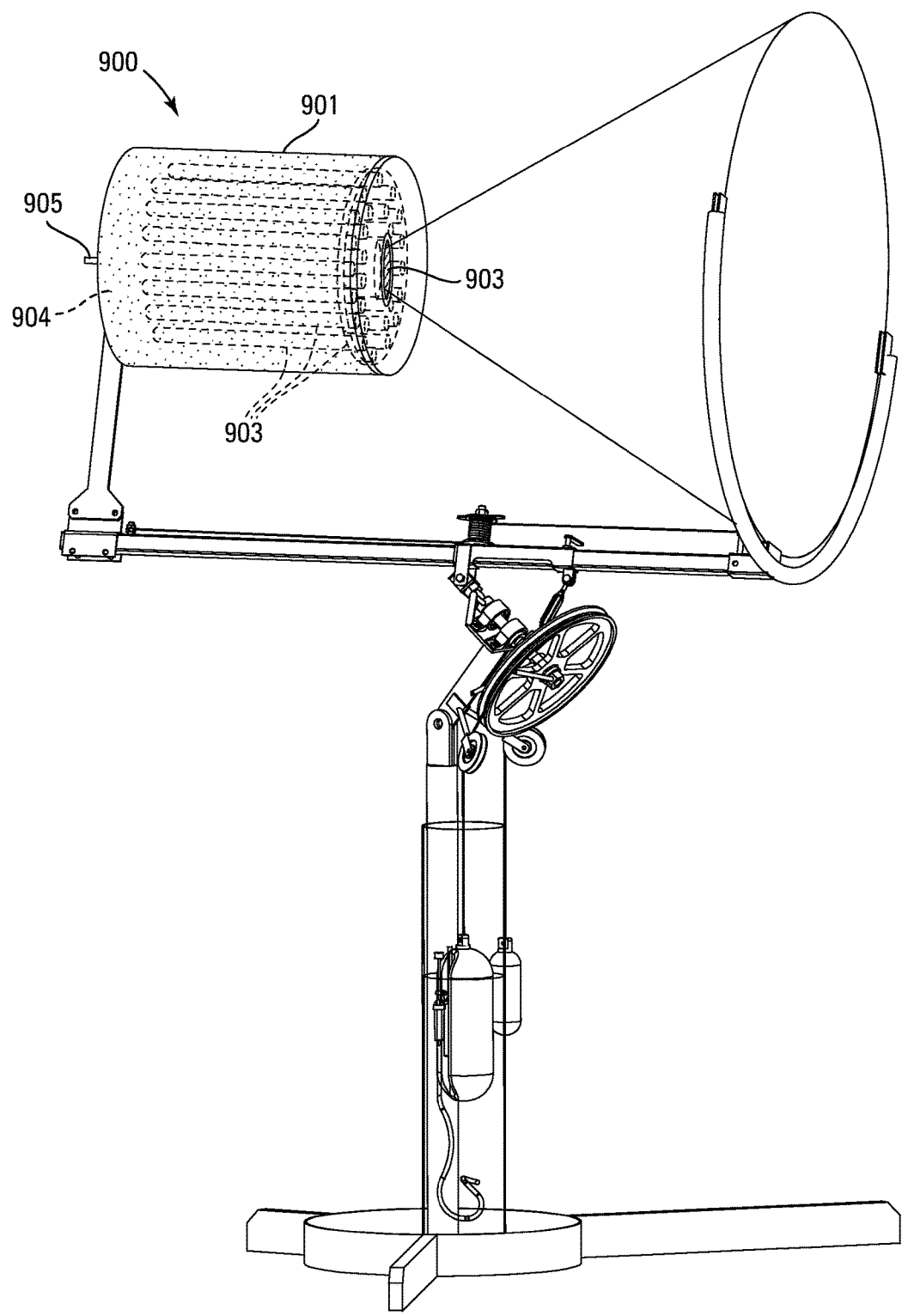

SOLAR TRACKING AND SOLAR ENERGY COLLECTION APPARATUS AND METHOD OF USING

This application is a continuation-in-part of non-provisional application Ser. No. 14/280,854, now U.S. Pat. No. 9,739,505, filed May 17, 2014 under 35 U.S.C. § 111(b) and claims the benefit as provided by 35 U.S.C. 119(e) of provisional application No. 61/937,396, filed Feb. 7, 2014.

FIELD OF THE INVENTION

The invention relates to apparatus used to track the sun to collect and store solar energy.

BACKGROUND

Different solar tracking mechanisms have been developed to track the sun to collect and/or convert solar energy as a "free" form of energy. U.S. Pat. Nos. 3,977,773, 4,165,734, 4,249,511, 4,546,756, 5,275,149, 5,632,823, 6,284,968, 8,151,787, 8,322,332 and published U.S. patent application US 2010/0326427 A1 all teach devices performing this function but most utilize complex drive systems featuring electric motors and sophisticated software. In remote regions of the world as well as among survivalists, electricity may not be available, making using such a device difficult to impossible. What is clearly needed then is a device that can be set up and used anywhere and that is simple to use and inexpensive.

BRIEF DESCRIPTION OF THE DRAWINGS

FIG. 1 is a side view of an embodiment of the invention.
FIG. 2 is a front view of the embodiment of the invention shown in FIG. 1.
FIG. 3 is an opposite side view of the embodiment of the invention shown in FIG. 1.
FIG. 6 is a perspective view of another embodiment of the invention having gauges used to align or interpret the settings of the device.
FIG. 7 is a side view of an embodiment of the invention showing the hydraulically regulated rotation mechanism.
FIG. 8 is a side view of the tracking and balance adjustment mechanisms.
FIG. 8A is a close up of cables affixed to the main sheave.
FIG. 19 is a perspective view of a phase change material heat storage pot.

DETAILED DESCRIPTION

Figure 1A:
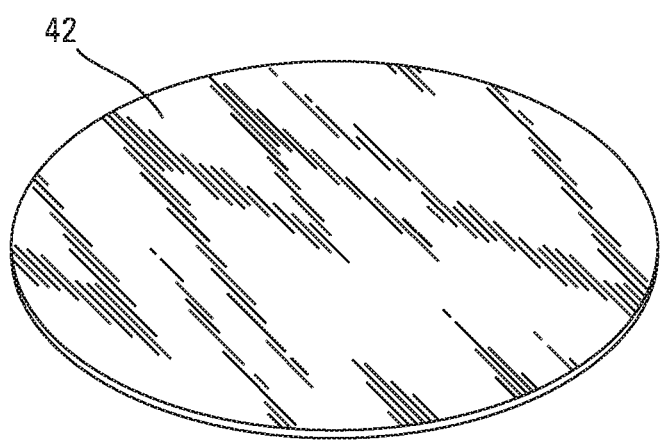
FIG. 1A is a perspective view of a Fresnel lens.

The particulars shown herein are by way of example and for purposes of illustrative discussion of the invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Nomenclature

100 Device
1 Stand
2 Latitude Adjustment Mount
2a Polar Alignment Sight
3 Polar Alignable Shaft
4 Primary Sheave
5 Wire Rope
6 Left Top Pulley
7 Right Top Pulley
8 Left Lower Pulley
9 Right Lower Pulley
10 Solar Elevation Turnbuckle
11 Seasonal Adjustment Mount
12 Carriage
12a First End of Carriage
12b Second End of Carriage
13a First Carriage Leg
13b Second Carriage Leg
14a First Carriage Leg Twist Lock
14b Second Carriage Leg Twist Lock
15a First Telescoping Leg Adjustment
15b Second Telescoping Leg Adjustment
16 Solar Energy Collecting Element
17 Carriage Rack
18 Carriage Rack Depth Post
19 Carriage Rack Adjustment Set Screw
20 Insulated Vessel
21 Cavity Receiver Cover
22 Cavity Receiver
23 Insulated Vessel Chamber
24 Cylinder
24a First Rod
24b Second Rod
25 Hydraulic Hose
26 Valve
27 Threaded Block 28 Block Hose Clamp
29 Weight Suspension Cap
30 Weight Cable
31a First Weight
31b Second Weight
32 Cable Clamp
33 Hose Clamps
34 Hydraulic Timing Control
36a Upper Fork Mount
36b Lower Fork Mount
42 Fresnel Lens
44 Piston
101 Stand
102 Polar-Aligned Support Shaft
103 Swivel Set Screw
104 Stand Swivel Post
105 Latitude Adjustment Mount
106 Polaris Alignment Sight
108 Motor
110 Solar Elevation Turnbuckle
111 Seasonal Adjustment Mount
112 Carriage
112a First End of Carriage
112b Second End of Carriage
113a First Carriage Leg
113b Second Carriage Leg
114a First Carriage Leg Twist Lock
114b Second Carriage Leg Twist Lock
115a First Telescoping Leg Adjustment
115b Second Telescoping Leg Adjustment
116 Solar Energy Collecting/Concentrating Element (Generic)
117 Carriage Rack
118 Carriage Rack Depth Post
119 Carriage Rack Adjustment Set Screw
120 Insulated Vessel
121 Cavity Receiver Cover
122 Cavity Receiver
123 Insulated Vessel Chamber
142 Lens
200 Device
201 Stand
202 Latitude Adjustment Mount
202a Latitude Adjustment Gauge
203 Polar Alignable Shaft
206 Latitude adjustment Sight
207 Rotation Adjustment Twist Lock/Gauge
208 Motor
209 Compass
210 Solar Elevation Turnbuckle
211 Solar Elevation Gauge
212 Carriage
212a First End of Carriage
212b Second End of Carriage
213 Laser Pointer
214 View Port
215 Carriage Rack with Depth Post and Set Screw
216 Generic Solar Energy Collection Element Mount
218 Focal Target
300 Device
400 Device
502 Brake
503 Carriage Aiming Handle
504 Carriage Drive Locknut Handle
507 Sleeve
508 Set Screw
509 First Cable Stop
510 First Cable
511 Balance Adjustment Knob
512 Second Cable
513 Second Cable Stop
514 Photovoltaic Cell
515 Target Attachment (Generic)
516 Parabolic Dish
517 Oven with Swivel Pot
518 Oven
520 Concentrated Photovoltaic Cell
600 Drip Drive Assembly
601 Cylinder Vessel
602 Floating Weight
603 Fluid
604 Strap
605 Counterweight
606 Floating Weight Wire Rope
607 Counterweight Wire Rope
608 Drain Hose
609 Collection Bellows
610 Fluid Drip Assembly
610a Drip Chamber
610b Valve
610c Valve Intake
610d Extended Valve Adjustment Screw
610e Breather Hose
700 Bellows Assembly
701 Main Weight
702 Support Frame
702a Support Frame Left End
702b Support Frame Right End
703 Left Bellows
704 Right Bellows
705 Pivot Mount
706 Inside Fluid
707 Main Weight Wire Rope
712 Carriage
712a First End of Carriage
712b Second End of Carriage
750 Device
800 Device
900 Latent Energy Storage Device
901 Insulated Phase Change Material Container
903 Targeted Heat Transfer Radiator
904 Phase Change Material
905 Depth Post Definitions "Equinox" refers to a celestial phenomenon wherein twice a year (around March 20 and September 22) the plane of the Earth's equator passes the center of the Sun. It is commonly known as the times of year when the hours of light and dark during a day are equal.

"Fresnel Lens" refers to a flat, relatively thin lens having a large aperture and short focal length. The Fresnel lens has a plurality of spherical arcs inscribed into it, resulting in light being focused on a single point.

"Polaris" refers to a star (a UMI, a Ursae Minoris, Alpha Ursae Minoris) in the Milky Way galaxy commonly known as the North Star, Northern Star, Pole Star, also Lodestar, sometimes Guiding Star. It is the brightest star in the constellation Ursa Minor and is very close to the north celestial pole of Earth, making it the current northern pole star.

Construction

Figure 8B:
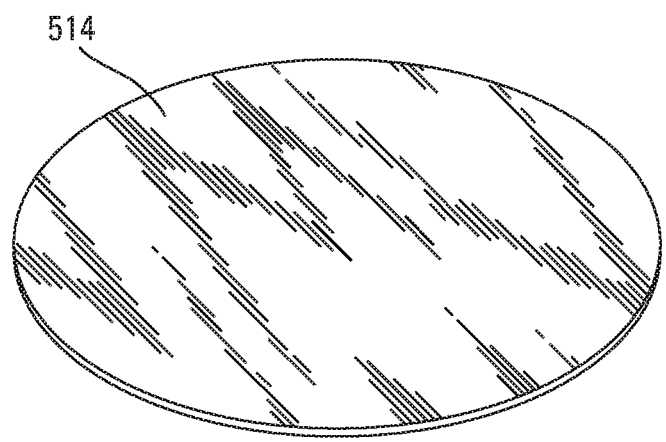
FIG. 8B is a perspective view of a photovoltaic cell.
Figure 9:
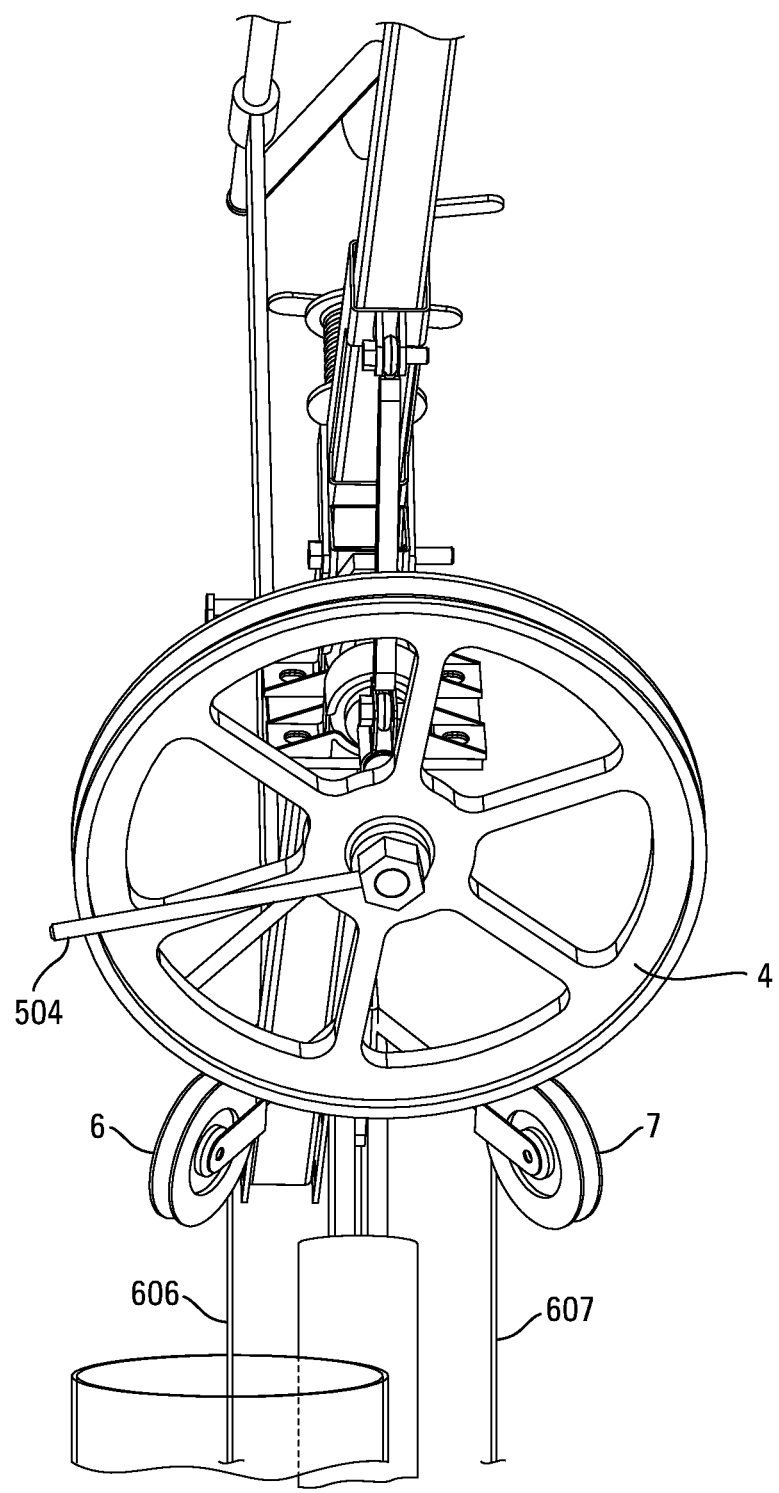
FIG. 9 is a detail view of the primary sheave assembly.

The invention relates to a device 100, 200, 300, 400, 750, 800 used for tracking the path of the sun, resulting in the collection of solar energy. As shown in FIG. 1 in one embodiment the device 100 can be fitted with a solar energy collecting element 16, which focuses the sun's rays on a carriage 12 which can vary in nature to hold and house a solar collection, concentration or conversion receiver. In one embodiment (not shown) the solar energy collecting element can be a Fresnel lens 42 as shown in FIG. 1A, or other collection or focusing device. In all these embodiments the device 100, 200, 300, 400, 750, 800 can be fitted with a photovoltaic cell 514 as best shown in FIG. 8B or a combination of a Fresnel lens 16 and photovoltaic cell 514 to generate electrical energy.

The device 100 is mounted on a stand 1 which serves to raise it from the ground. The stand 1 can be either permanently mounted in the ground or concrete etc. or affixed to a base which would allow repositioning the device 100 and/or allow it to be moved to a different location. A carriage 12 is mounted on a polar alignable shaft 3. The carriage 12 serves to house and secure the solar energy collecting element 16 at an adjustable distance through the cavity receiver cover 21, to the cavity receiver 22 of the insulated vessel 20 or other latent energy storage vessel. In an alternative embodiment the latent energy storage vessel could be a flat plate (not shown). The cavity receiver 22 can contain any liquid or solid material that exhibits thermal-storage phase change characteristics whose temperature will increase as a result of concentrated perpendicular sun rays striking it and only slowly release the heat. Inorganic materials possessing the desired characteristics include bismuth, iron chloride, lithium nitrate, potassium nitrate, rhenium pentoxide, sodium nitrate, tin and zinc chloride. Organic materials include pChlorobenzoic acid, pNitrobenzoic acid, carbazole, anthraquinone and anthracene. It is understood that additional materials capable of absorbing high amounts of heat while not breaking down and later slowly releasing the heat also exist and that therefore the above lists of inorganic and organic materials is considered to be illustrative and therefore not limiting the scope of the invention.

Figure 5:
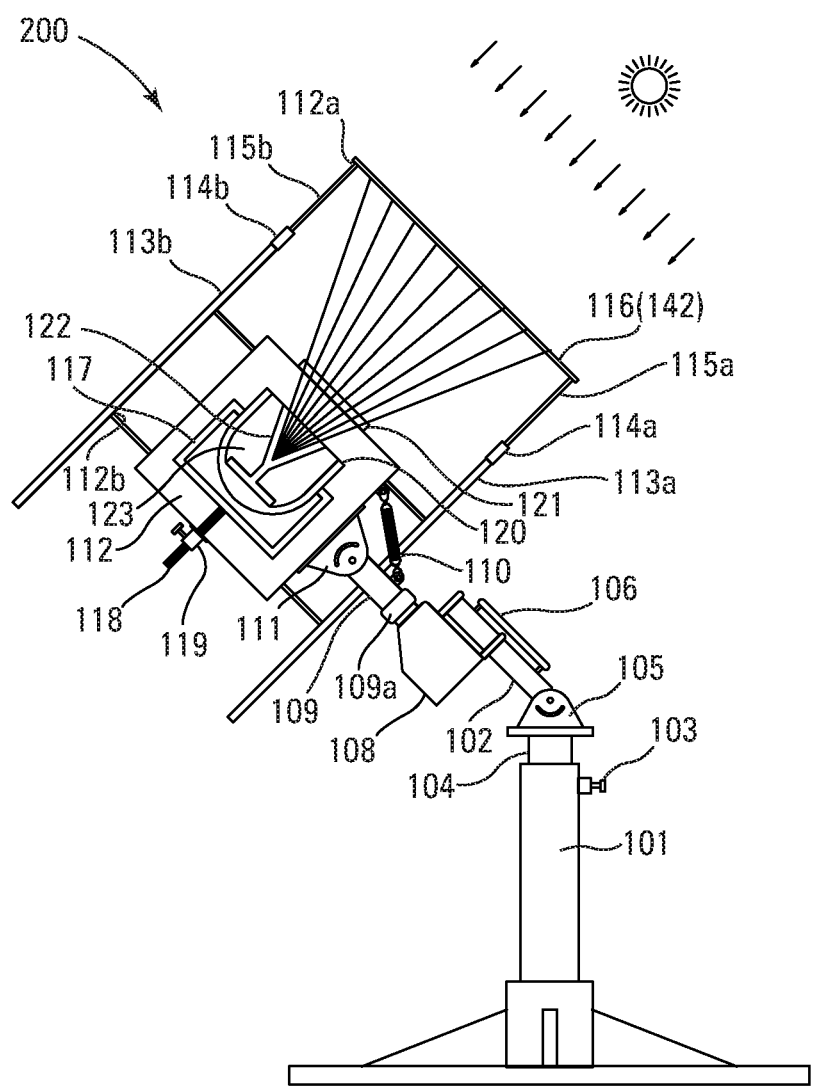
FIG. 5 is a side view of an alternative, electrically driven embodiment of the invention.

The position of the solar energy collecting element 16 with regard to the distance between it and the targeted insulated vessel 20 is adjustable by moving an adjustable depth post system connected to the carriage rack 17 using a telescoping leg adjustment mechanism which comprises a first telescoping leg adjustment 15a and a second telescoping leg adjustment 15b in conjunction with a first carriage leg 13a and first carriage leg twist lock 14b and second carriage leg 13b and second twist lock 14b which allows the distance between the carriage 12 and the solar energy collecting element 16 to be varied and secured. A polar alignable shaft 3 is attached to a rotational mechanism (unnumbered) which rotates the polar alignable shaft 3 and attached carriage 12 at a rate of 15 degrees per hour, which matches the apparent movement of the sun. In one embodiment, a weight driven device (unnumbered) with hydraulic timing control 34 is used to rotate the device 100, which is discussed in detail below. In other embodiments 200, 300 as shown in FIG. 5 and FIG. 6, an electric motor 108, 208 is used to rotate the carriage 112, 212.

In the embodiment shown in FIGS. 1-4B, the carriage 12 is adjustably mounted to a first end (unnumbered) of the polar alignable shaft 3 which is itself rotatably attached to a latitude adjustment mount 2. A second end of the polar alignable shaft 3 is fixedly attached to a primary sheave 4, which, due to its fixed attachment, rotates the carriage 12 when bias is applied, as explained below. A wire rope 5 or other flexible line defining a first end (unnumbered) and a second end (unnumbered) extends around the primary sheave 4 which is rotatably mounted to the carriage 12 and its attachments as discussed above. The second end (unnumbered) of the wire rope 5 is attached to a threaded block 27 by means of a hose clamp 28, which is attached to a hydraulic cylinder 24, which provides the rotation regulation function, as explained in more detail below. When a bias is applied to the primary sheave 4 via the wire rope 5 as explained below, the attached carriage 12 will rotate, thus following the Sun across the sky. As seen in FIG. 2, the wire rope 5 is fed through a pulley system comprising a left top pulley 6, right top pulley 7, left lower pulley 8, and right lower pulley 9 to guide the path of the wire rope 5.

Figure 4:
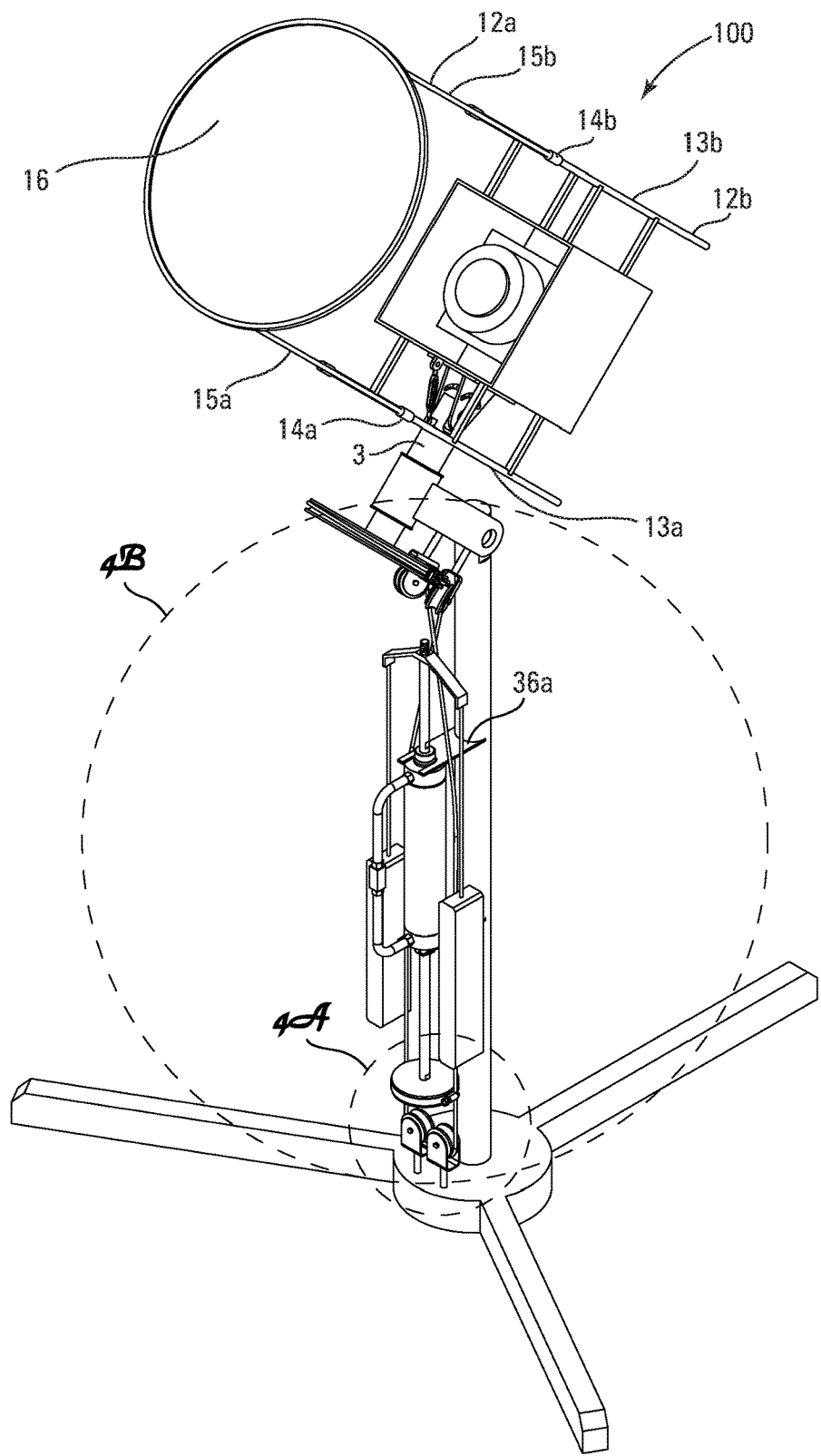
FIG. 4 is a perspective view of the embodiment of the invention shown in FIG. 1.
Figure 4B:
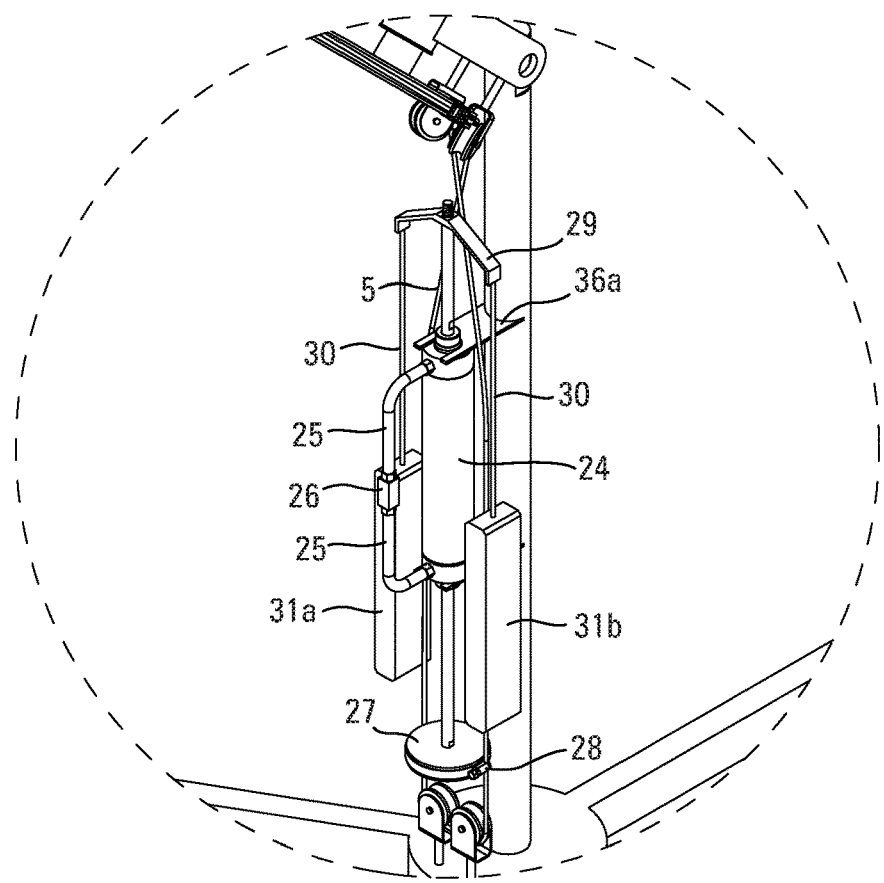
FIG. 4b is a perspective view of the detail of the invention shown in circle 4B around a portion of FIG. 4.
Figure 4A:
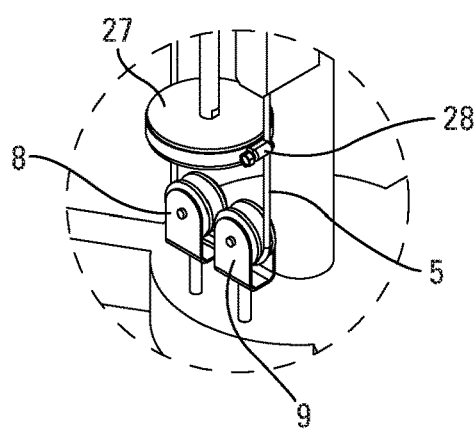
FIG. 4a is a perspective view of the detail of the invention shown in circle 4A around a portion of FIG. 4.

The rotation of the carriage 12 and its attachments are controlled by the use of a hydraulic cylinder 24 timing control system as best shown in FIG. 4B. A hydraulic cylinder 24 is attached to the stand 1. The hydraulic cylinder 24 houses a piston 44 and a first rod 24a attached to the piston 44 which extends out the top end of the cylinder 24 upward and a second rod 24b also attached to the piston 44 which extends from the bottom of the cylinder 24 toward the ground. A first weight 31a is attached to a first end (unnumbered) of a weight cable 30 and a second weight is likewise attached to a second end (unnumbered) of the weight cable 30. The weight cable 30 and first 31a and second weights 31b are attached to the top of the first rod 24a and apply a bias tending to force the first rod 24a and piston downward. A hydraulic hose 25 connects the area inside the cylinder 24 on the top side of the piston 44 with the area inside the cylinder 24 on the bottom side of the piston 44 allowing hydraulic fluid to flow from the area on the bottom side of the cylinder 24 through the hydraulic hose 25 to the area on the top side of the cylinder 24. An adjustable valve 26 allows adjustment of the rate of downward movement of the piston 44, thereby controlling the rate of descent of the weights 31 and weight cable 30.

The adjacent second-side parallel run (unnumbered) of the wire rope 5 is attached to a threaded block 27 by means of a block hose clamp 28. The wire rope 5 is threaded first through the right lower pulley 9, the left lower pulley 8, up the length of the stand 1. Next, the wire rope 5 is threaded through the right top pulley 7 and around the primary sheave 4, through the left top pulley 6 and back down the length of the stand 1. The ends (unnumbered) of the wire rope 5 meet at the primary sheave and are secured to it by clamps (not shown). As the weights 31a, 31b force the piston 44 downward the piston 44 displaces hydraulic fluid through the hydraulic hose 25 at a rate controlled by the adjustable valve 26 from the part of the interior on the bottom side of the interior of the hydraulic cylinder 24 to the part of the interior on the top side of the interior of the hydraulic cylinder 24. The second side parallel run (unnumbered) of the wire rope 5 which is attached to the threaded block 27 moves in a downward manner, causing the primary sheave 4 and attachments to rotate at a predetermined, controlled rate.

Figure 14:
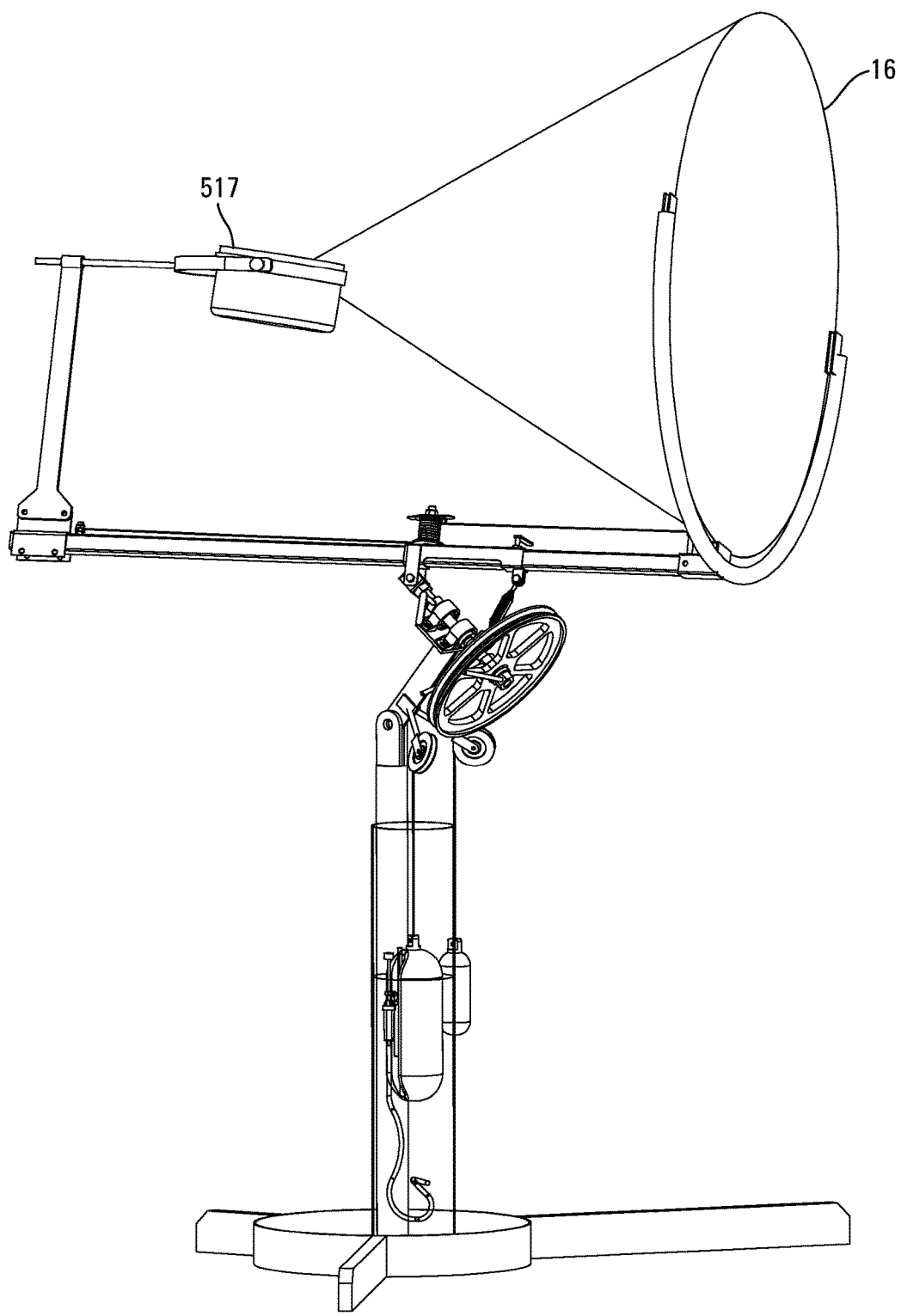
FIG. 14 is a perspective view of an embodiment of the invention containing a swivel pot target.
Figure 15:
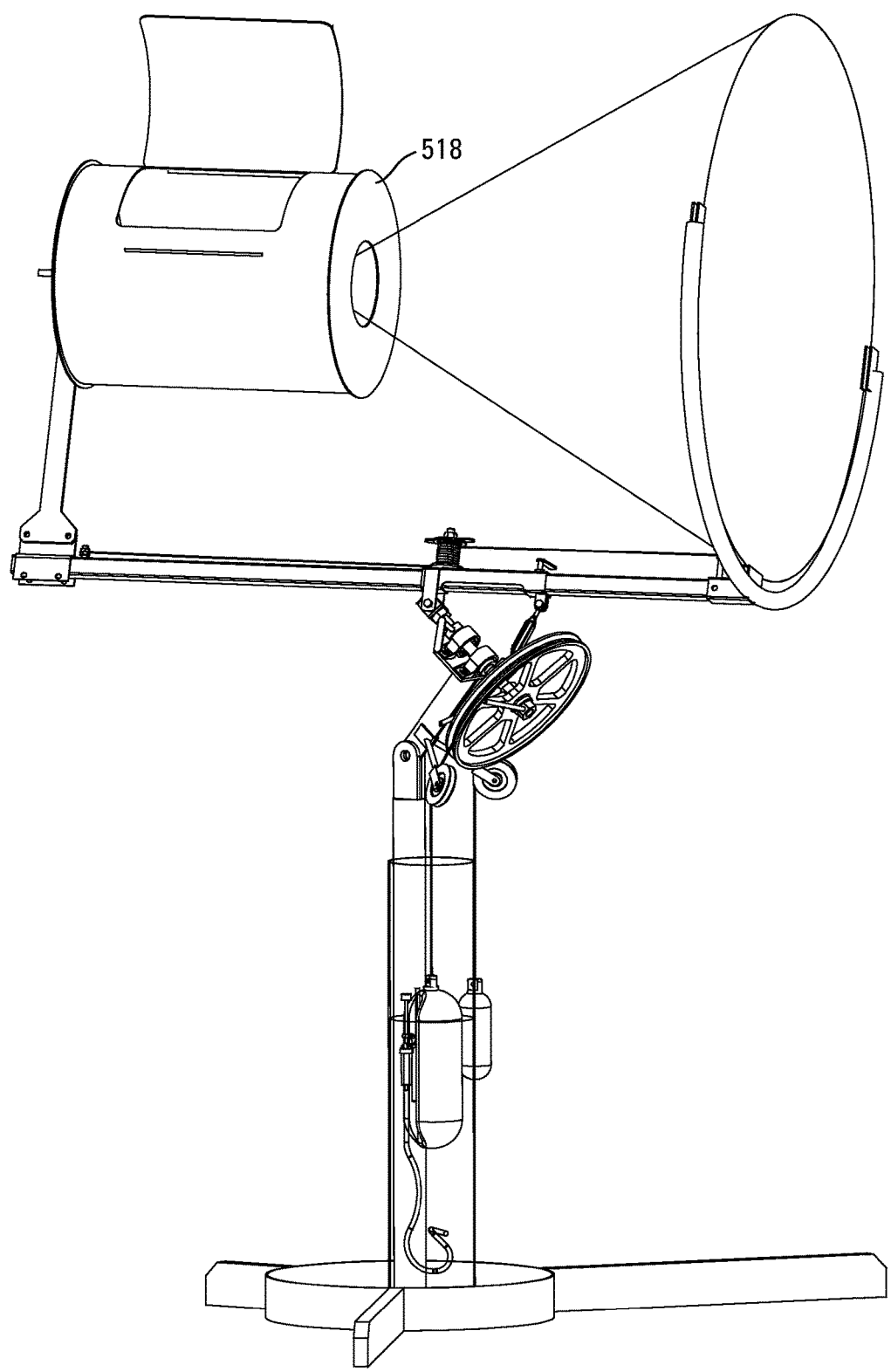
FIG. 15 is a perspective view of an embodiment of the invention containing an oven target.
Figure 16:
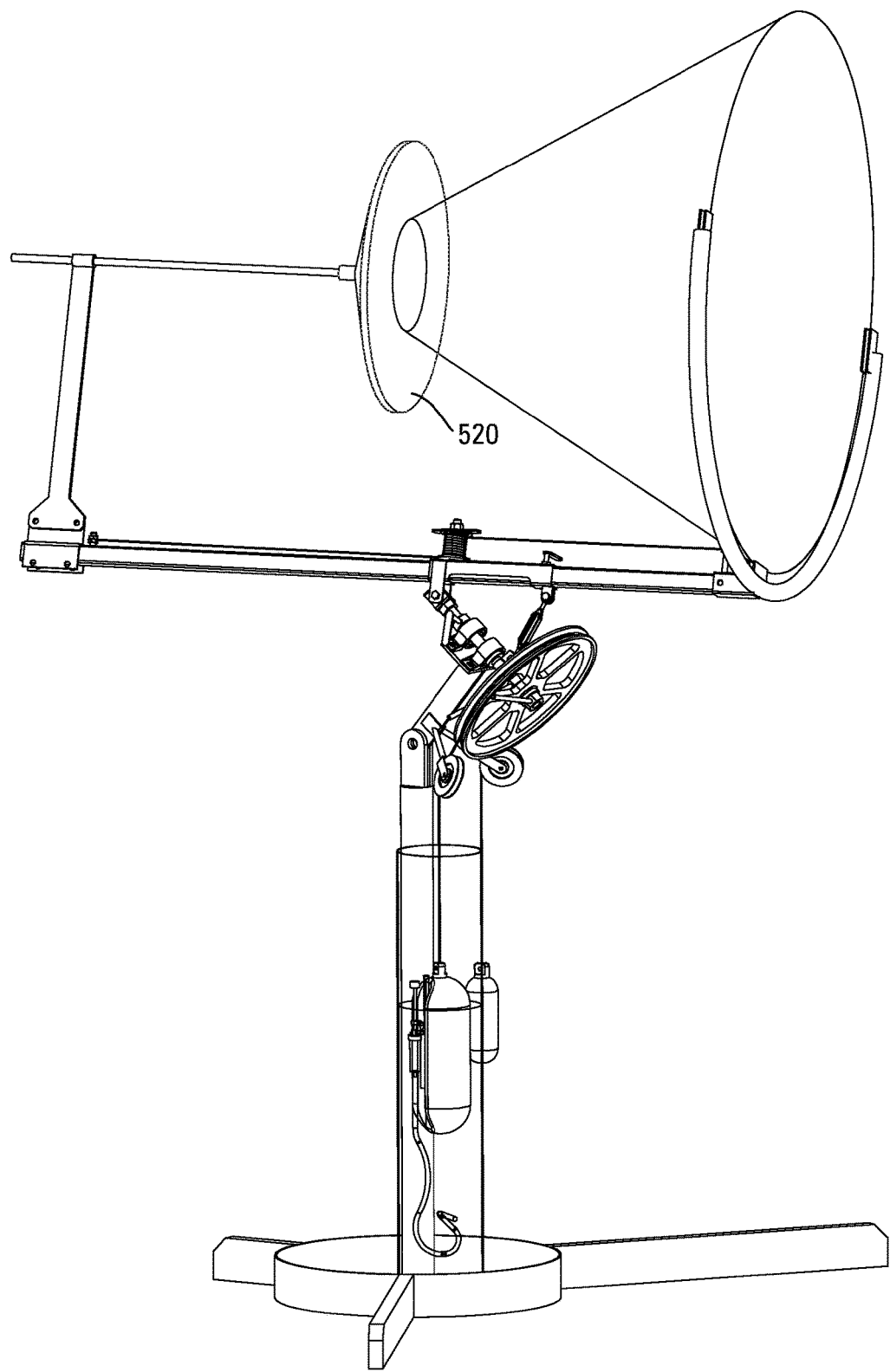
FIG. 16 is a perspective view of an embodiment of the invention containing a concentrated photovoltaic cell target.
Figure 17:
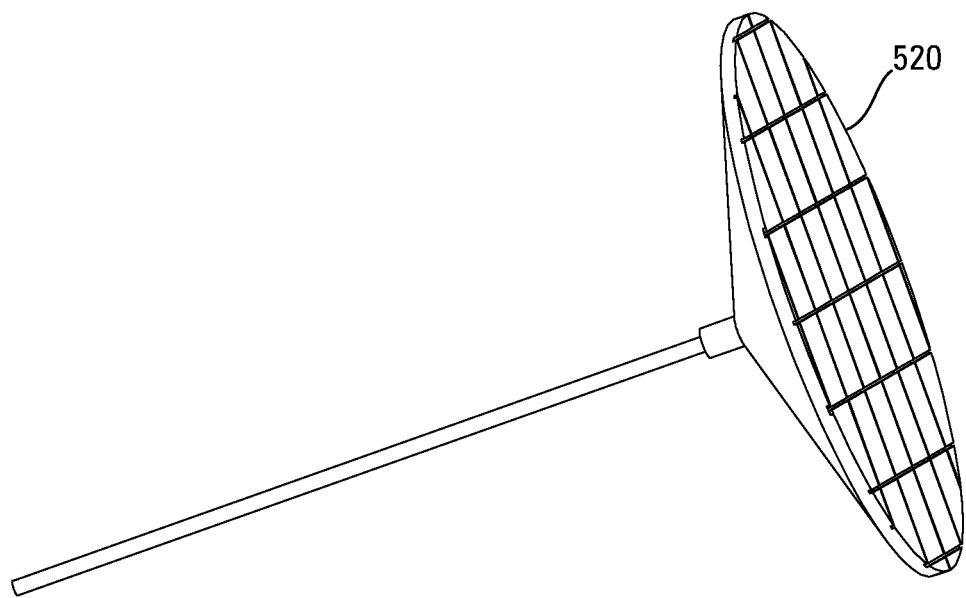
FIG. 17 is a perspective view of a concentrated photovoltaic cell.
Figure 18:
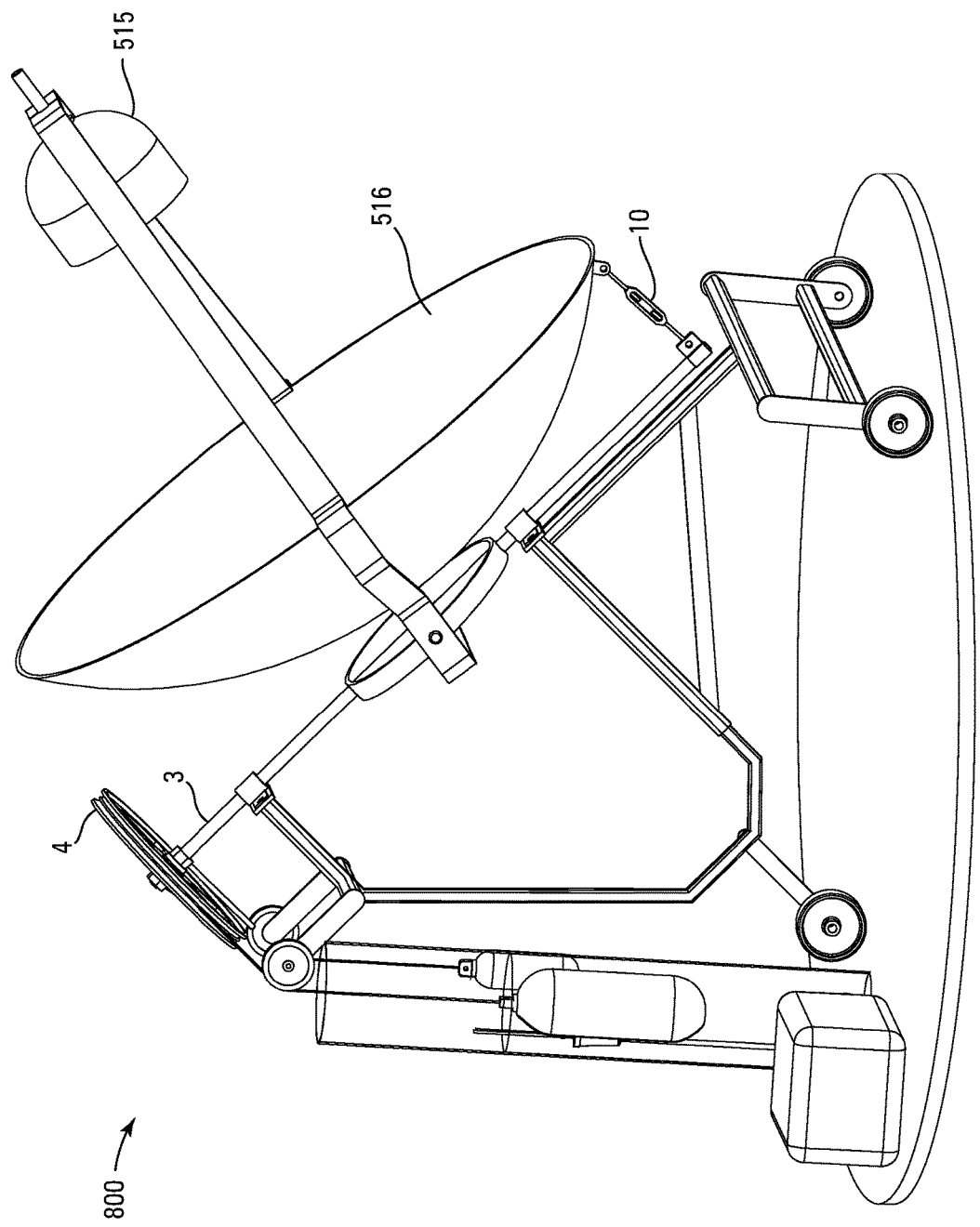
FIG. 18 is a perspective view of an embodiment of a parabolic dish with target attachment.

In an embodiment, the invention relates to a device 400 used for tracking the path of the sun, resulting in the collection of solar energy. As shown in FIG. 7, in one embodiment the device 400 can be fitted with a solar energy collecting element 16, or a photovoltaic cell 514 as best shown in FIG. 8b or a Fresnel lens 42 as best shown in FIG. 1A, which focuses the sun's rays onto a target attachment 515 The target attachment 515 can vary in nature to hold and house an insulated vessel 20, photovoltaic cell 514 as best shown in FIG. 8B, oven with swivel pot 517 as best shown in FIG. 14, an oven 518 as best shown in FIG. 15 or a concentrated photovoltaic cell 520 as best shown in FIG. 17, latent energy storage device 900, or other solar collection, concentration or conversion receiver and other devices for cooking, boiling, steaming or smelting. In another embodiment, the device 400 can support a parabolic dish 516 aimed at a target attachment 515 as shown in FIG. 18 or a latent energy storage device 900 as best shown in FIG. 19.

The device 400 is mounted on a stand 1 which serves to raise it from the ground and stabilize it during use. The stand 1 can be either permanently mounted in the ground or concrete etc. or affixed to a base which would allow repositioning the device 400 and/or allow it to be moved to a different location. The carriage 12 is mounted on a polar alignable shaft 3. The carriage 12 serves to house and secure the solar energy collecting element 16 at an adjustable distance from a targeted receiver such as a photovoltaic cell (FIG. 8B), an oven (FIG. 15), swivel pot (FIG. 14), concentrated photovoltaic cell (FIG. 17) other insulated vessel 20 or other latent energy storage vessel. In an alternative embodiment the targeted receiver could be a latent energy storage device 900 (FIG. 19) comprising an insulated phase change material container 901, targeted heat transfer radiator 903, phase change material 904 and depth post 905. The phase changer material container 901 can contain any liquid or solid material that exhibits thermal-storage phase change characteristics whose temperature will increase as a result of concentrated perpendicular sun rays striking it and only slowly release the stored heat. In organic materials possessing the desired characteristics include bismuth, iron chloride, lithium nitrate, rhenium pentoxide, sodium nitrate, tin and zinc chloride. Organic materials include pChlorobenzoic acid, pNitrobenzoic acid, carbazole, anthraquinone and anthracene. It is understood that additional materials capable of absorbing high amounts of heat while not breaking down and later slowly releasing the heat also exist and that therefore the above lists of inorganic and organic materials is considered to be illustrative and therefore not limiting the scope of the invention.

The position of the solar energy collecting element 16 with regard to the distance between it and the target attachment 515 is adjustable by moving an adjustable depth post system connected to the carriage 12. A polar alignable shaft 3 is attached to a rotational mechanism (unnumbered) which rotates the polar alignable shaft 3 and attached carriage 12 at a rate of fifteen degrees per hour, which matches the apparent movement of the sun. In this embodiment, the device 400 a drip drive assembly 600 is used to rotate the device 400, which is discussed below in detail.

In the embodiment shown in FIG. 8, the carriage 12 is adjustably mounted in a sleeve 507 and fixed in place by a set screw 508. A balance adjustment knob 511 is attached to the top of a sleeve 507. A first cable 510 is attached to the balance adjustment knob 511 and wound counter-clock-wise and then attached to first cable stop 509. A second cable 512 is connected to the balance adjustment knob 511 and wound clockwise and then attached to the second cable stop 513.

The lower forward end (unnumbered) of the sleeve 507 is adjustably mounted to the polar adjustable shaft 3 by a turnbuckle 10 or similar adjustable support mechanism, for adjusting seasonal variations. The lower back end of the sleeve 507 is hinged to the upper end of the polar alignable shaft 3. The polar aligned shaft 3 is rotatably attached to a latitude adjustment mount 2. The bottom end of the polar alignable shaft 3 is freely or fixedly attached to a primary sheave 4.

Figure 10:
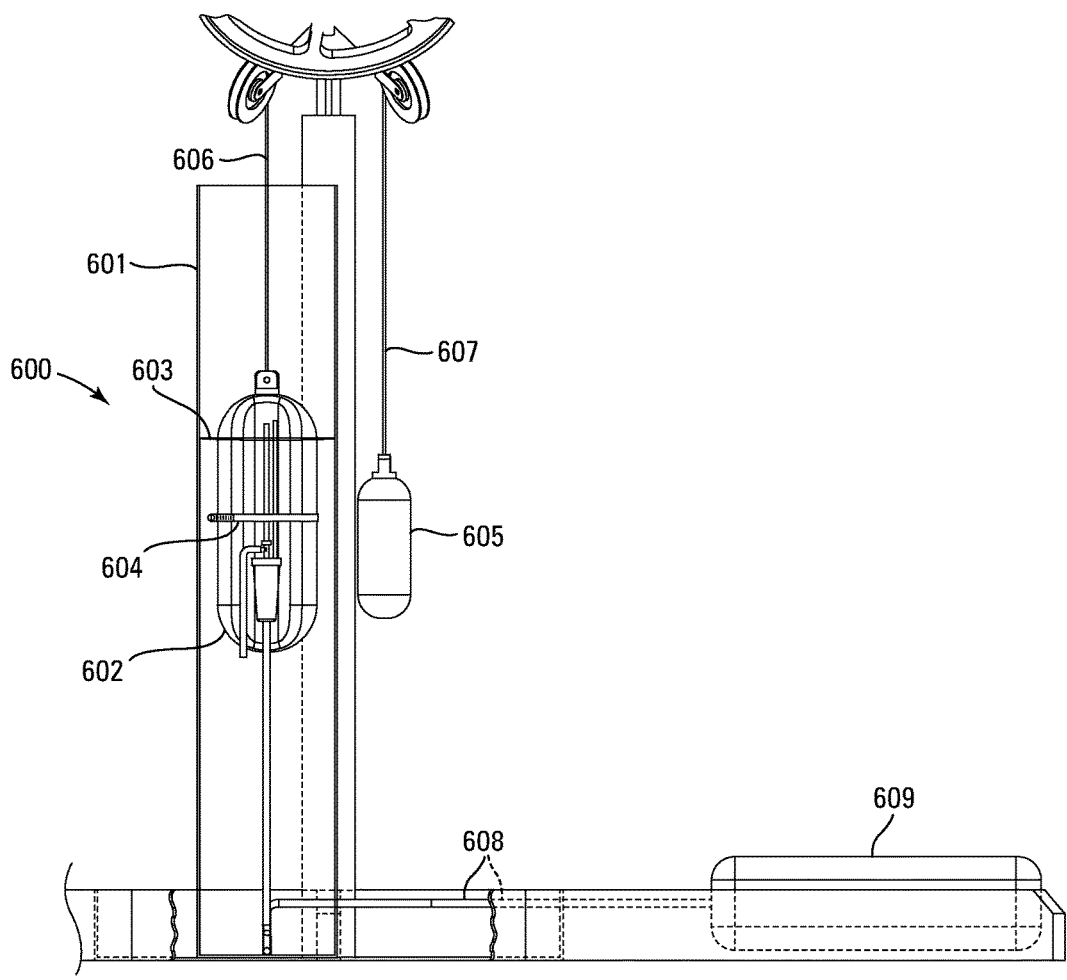
FIG. 10 is a detail view of the cylinder vessel and weight and counterweight.
Figure 11:
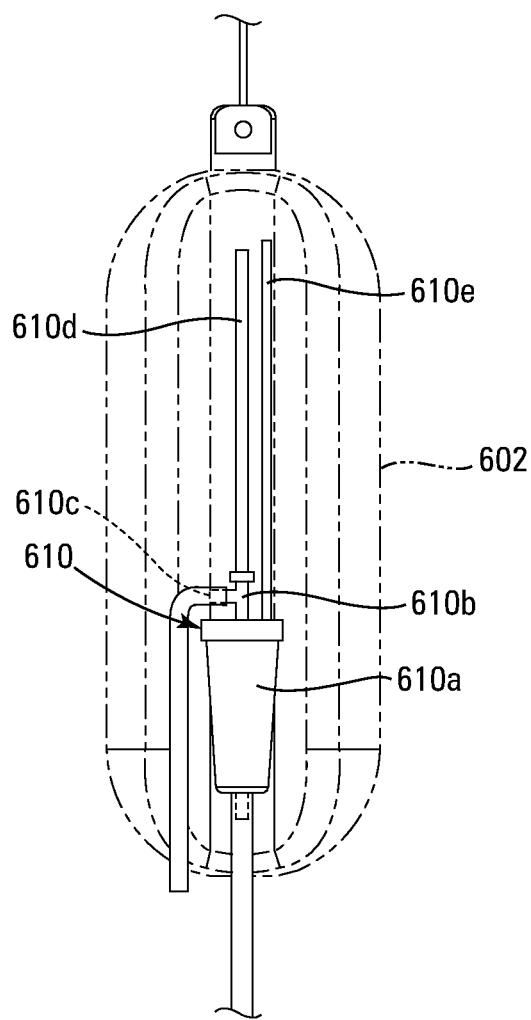
FIG. 11 is a detail view of the fluid drip assembly.

The rotation of the carriage 12 and its attachments is controlled by the use of a drip drive assembly 600 best shown in FIG. 10. A floating weight wire rope 606 attaches to a floating weight 602 and runs over the left top pulley 6 along its top and is affixed to the primary sheave 4. The floating weight 602 is suspended in fluid 603 inside a cylinder vessel 601. Attached to the floating weight 602 is a fluid drip assembly 610 as best shown in FIG. 11. The fluid 603 which supports the floating weight 602 drains out of the cylinder vessel 601 through a valve intake 610c and passes through the drip chamber 610a where the breather hose 610e breaks the siphon. The fluid continues down out the drip chamber 610a and down a drain hose 608 into the collection bellows 609. As the fluid 603 drains, the floating weight 602, suspended and supported by the fluid 603 descends with the descending fluid 603 level, applying bias to the primary sheave 4 via the floating weight wire rope 606 and thus the primary sheave rotates the attached carriage 12. A counterweight wire rope 607 attaches to the counterweight 605 and runs over the right front pulley 7 and is affixed to primary sheave 4. The counterweight 605 applies slight bias against the force of the floating weight 602 to prevent over-rotation. With the valve 610b properly adjusted, the descending fluid 603 level results in the descending weight and subsequent rotation bias of the primary sheave 4 and the carriage 12 which allows the device to track the sun across the sky.

Because the fluid drip assembly 610 is attached to the floating weight 602 the valve intake 610c remains at a constant distance from the top of the fluid 603. Because the fluid pressure comes only from above the valve intake 610c with a static valve 610b adjustment, this constant position translates to a constant fluid pressure and subsequently to a constant rate of drain through the valve 610b. The constant rate of drain translates to a constant descent of the fluid level and constant movements of the primary sheave 4 and carriage 12. The valve 610b is adjusted to set the rotation of the carriage at fifteen degrees per hour, following the apparent movement of the sun across the sky.

In an alternative embodiment (now shown) the fluid drip assembly 610 can be plumbed into the drain hose 608 between the cylinder vessel 601 and the collection bellows 609 and thus located outside of the cylinder vessel 601.

Operation

Pre-Operation

In the embodiment shown in FIGS. 1-4B with the device 100 permanently polar-aligned and fully assembled, two initial adjustments must be made with each use. First the elevation of the carriage 12 must be adjusted using an adjustable support mechanism, such as a solar elevation turnbuckle 10. Second, a cable clamp 32, trapped by hose clamps 33 on each side, is freed from its fixed position along the edge of the primary sheave 4 and slid in the necessary direction to adjust rotation position. This second adjustment compensates for changes in the equation of time. These two adjustments are to position the face of the solar energy collecting element 16 perpendicular to the sun's rays. For example, when using a Fresnel lens 42 the corrected adjustment places concentrated sunlight on the target receiver. With these two adjustments made, the block hose clamp 28 is attached to the wire rope 5 with a hose clamp 27 and the weights 31a, 31b, and attached weight suspension cap 29 and weight cable 30 is attached to the top rod 24a.

In the motorized embodiments 200, 300 as shown in FIG. 5 and FIG. 6, with the device permanently polar-aligned and fully assembled two initial adjustments must be made with each use. First the elevation of the carriage 112, 212 must be adjusted using the solar elevation turnbuckle 110, 210. This adjustment compensates for changes in the season. Second a twist lock 109a, 207 is released and then reset to adjust the rotation position. The second adjustment compensates for the changes in the equation of time. These two adjustments are to position the face of the solar energy collection element 116, 216 perpendicular to the sun's rays. For example, using a Fresnel lens 42 the corrected adjustment places concentrated sunlight on the target receiver.

In the embodiment shown in FIG. 7, with the device 400 fully assembled and permanently adjusted for North/South position and latitude, the following steps occur prior to each use. First, elevation of the carriage 12 is seasonally adjusted using an adjustable support mechanism such as a solar elevation turnbuckle 10. Second, if the carriage 12 is out of balance, the set screw 508 must be loosened and the balance adjustment knob 511 turned either direction to balance the carriage 12, then the set screw 508 is tightened.

In the embodiment 100 shown in FIG. 1, with the hydraulic assembly pushing down on the threaded block 27 connected by the block hose clamp 28 to the wire rope 5 the operator opens and adjusts the valve 26 which starts the movement of the device 100. The block 27 thus pulls down on the right run of the wire rope 5 causing the polar alignable shaft 3 to rotate. With proper polar alignment and correct elevation and rotation adjustments, rotation of the carriage 12 will track the sun. In the motorized embodiments 200, 300 an electric motor 108, 208 is programmed to rotate the device 200, 300 at the correct rate beginning at a programmed time. With proper polar alignment and correct elevation and rotation adjustments, rotation of the carriage 112, 212 at fifteen (15) degrees per hour will track the sun.

To operate the device 400, the cylinder vessel 601 is filled with a fluid 603 such as water, windshield anti-freeze fluid or ethylene glycol. If the device 400 has been previously used, the fluid can be poured from the collection bellows 609 into the cylinder vessel 601. Adding the fluid 603 to the cylinder vessel 601 causes the floating weight 602 to rise and simultaneously cause the primary sheave 4 and carriage 12 to rotate clockwise and the counterweight 605 to descend. When filling the cylinder vessel 601 is completed, with the valve 610b properly adjusted using the extended valve adjustment knob 610d, the fluid 603 will begin to drain through the valve intake 610c and pass through the valve 610b, drip chamber 610a, drain hose 610e and into the collection bellows 609. As the fluid 603 drains and the fluid 603 level descends with the force of the now descending floating weight 602 applying bias through the floating weight wire rope 606 will begin to slowly rotate the primary sheave 4. With the primary sheave 4 slowly rotating, the carriage 12 is then aimed at the sun using the carriage aiming handle 503 the carriage drive lock nut handle 504 is turned counterclockwise to disconnect the polar alignable shaft 12 and carriage 12 from the primary sheave 4 thus allowing the carriage to rotate freely. The carriage 12 is then is then aimed at the sun using the carriage aiming handle 503 and then the carriage drive lock nut handle 504 is rotated clockwise to tighten the primary sheave 4 onto the polar alignable shaft 3 thus fixing the rotation of the primary sheave 4 together with the polar alignable shaft 3 and the carriage 12. The device 400 will now track the sun until the fluid 603 has fully drained from the cylinder vessel 601. To reuse, make the necessary seasonal and balance adjustments, refill the cylinder vessel 601, disconnect the drive, re-aim the device 400 and reengage the drive.

Figure 12:
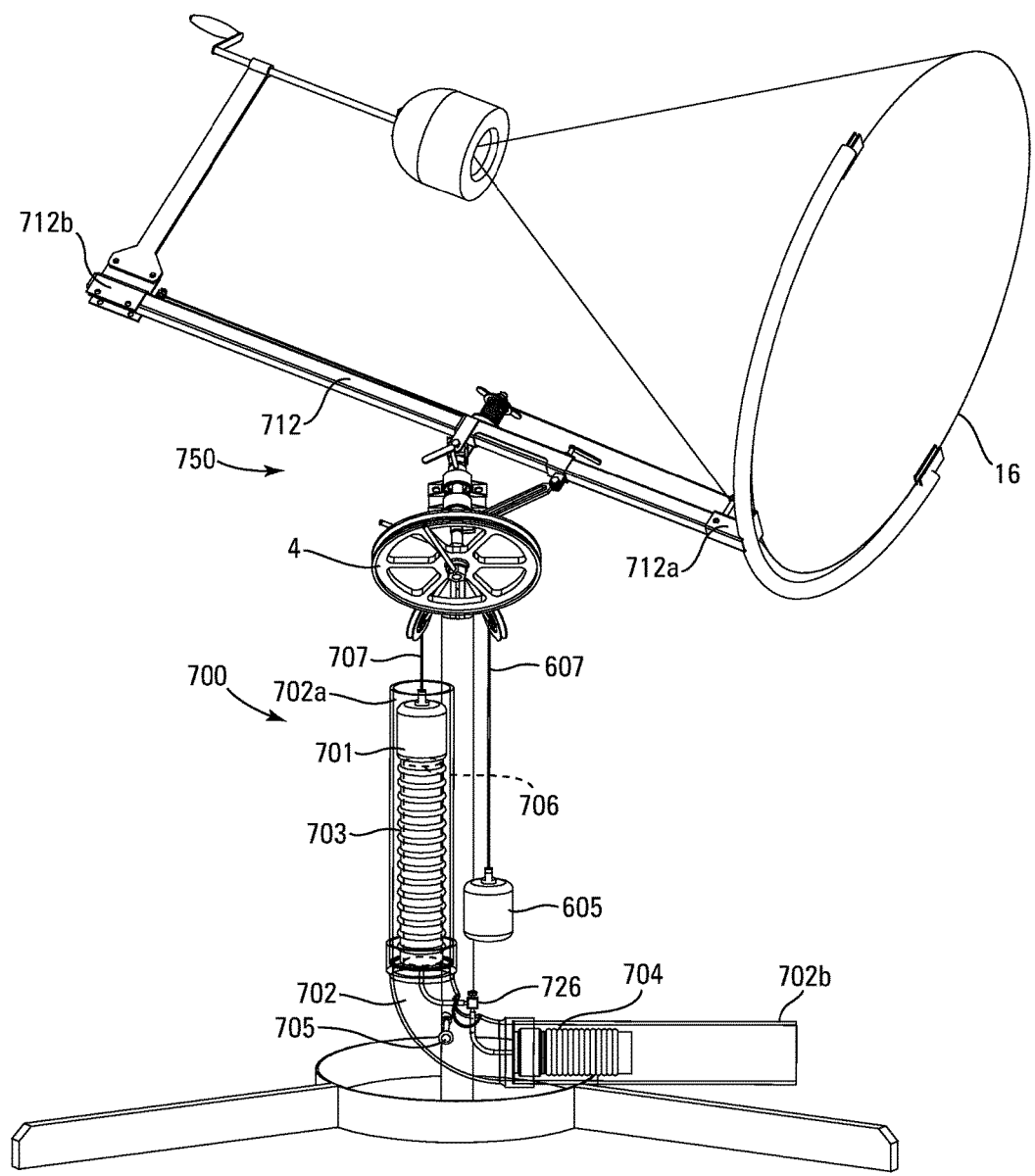
FIG. 12 is a perspective view of an alternative embodiment of the invention.
Figure 12A:
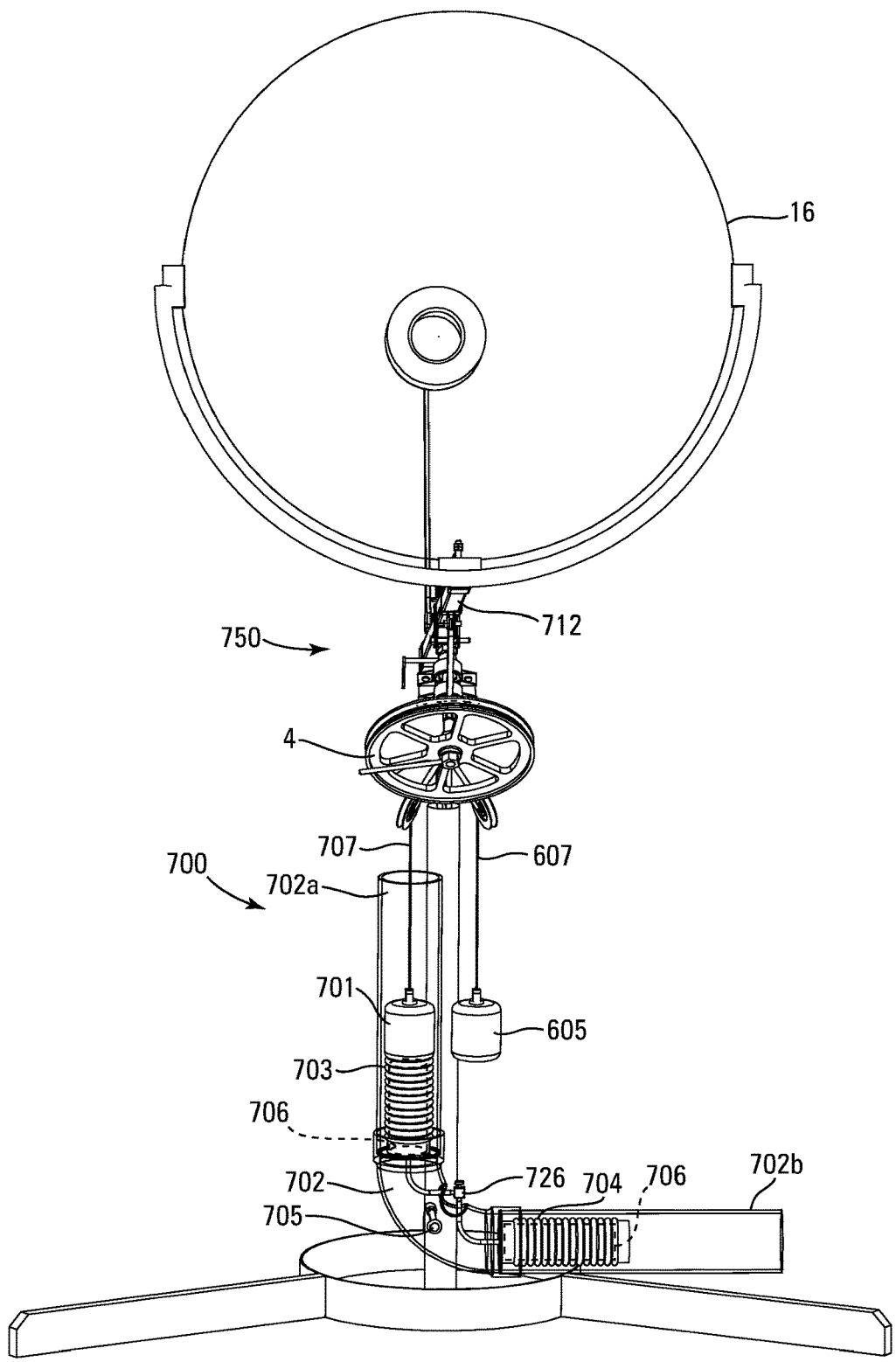
FIG. 12A is a perspective view of a bellows drive half way through initial operation.
Figure 12B:
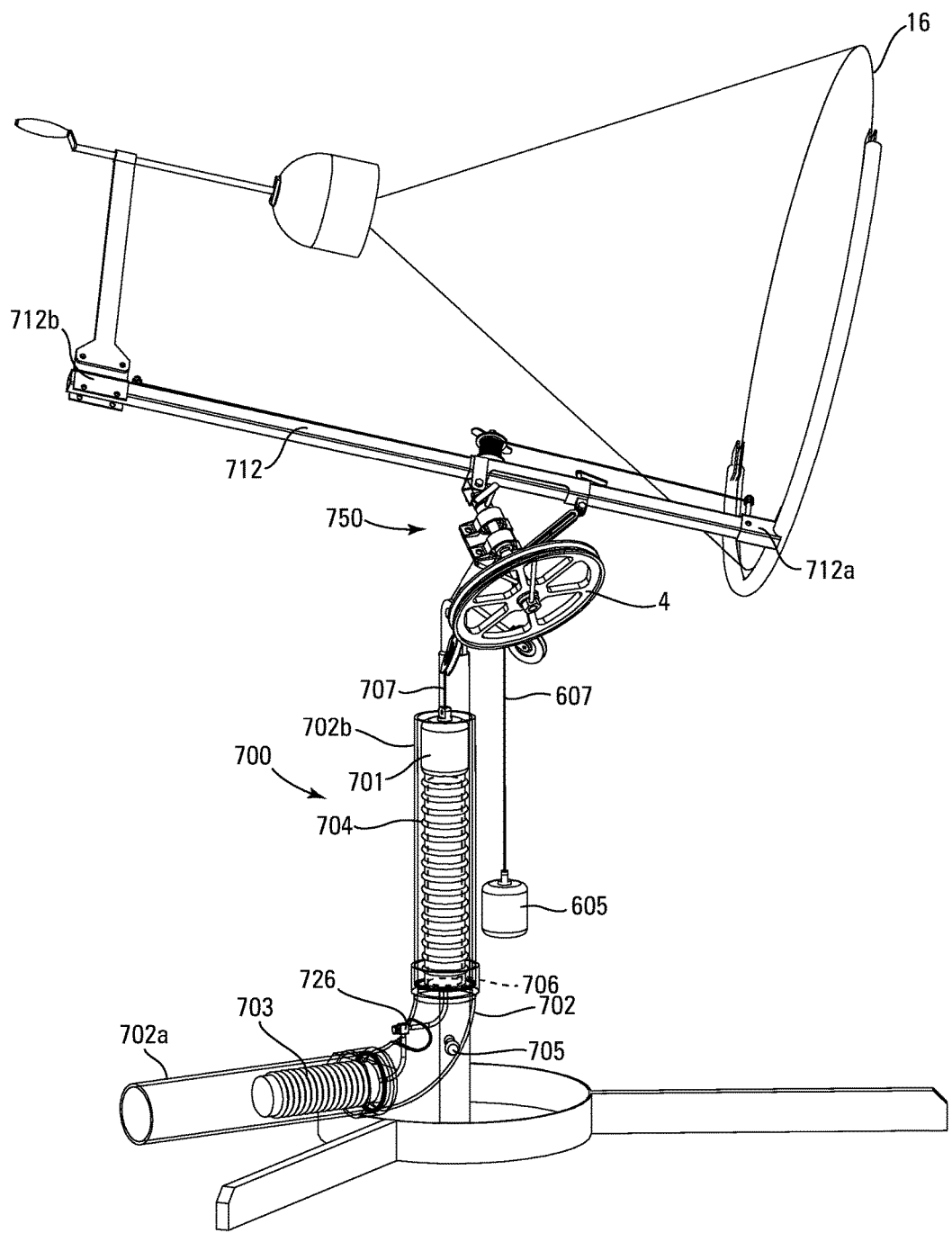
FIG. 12B is a perspective view of a bellows drive re-set for alternative operation.
Figure 13:
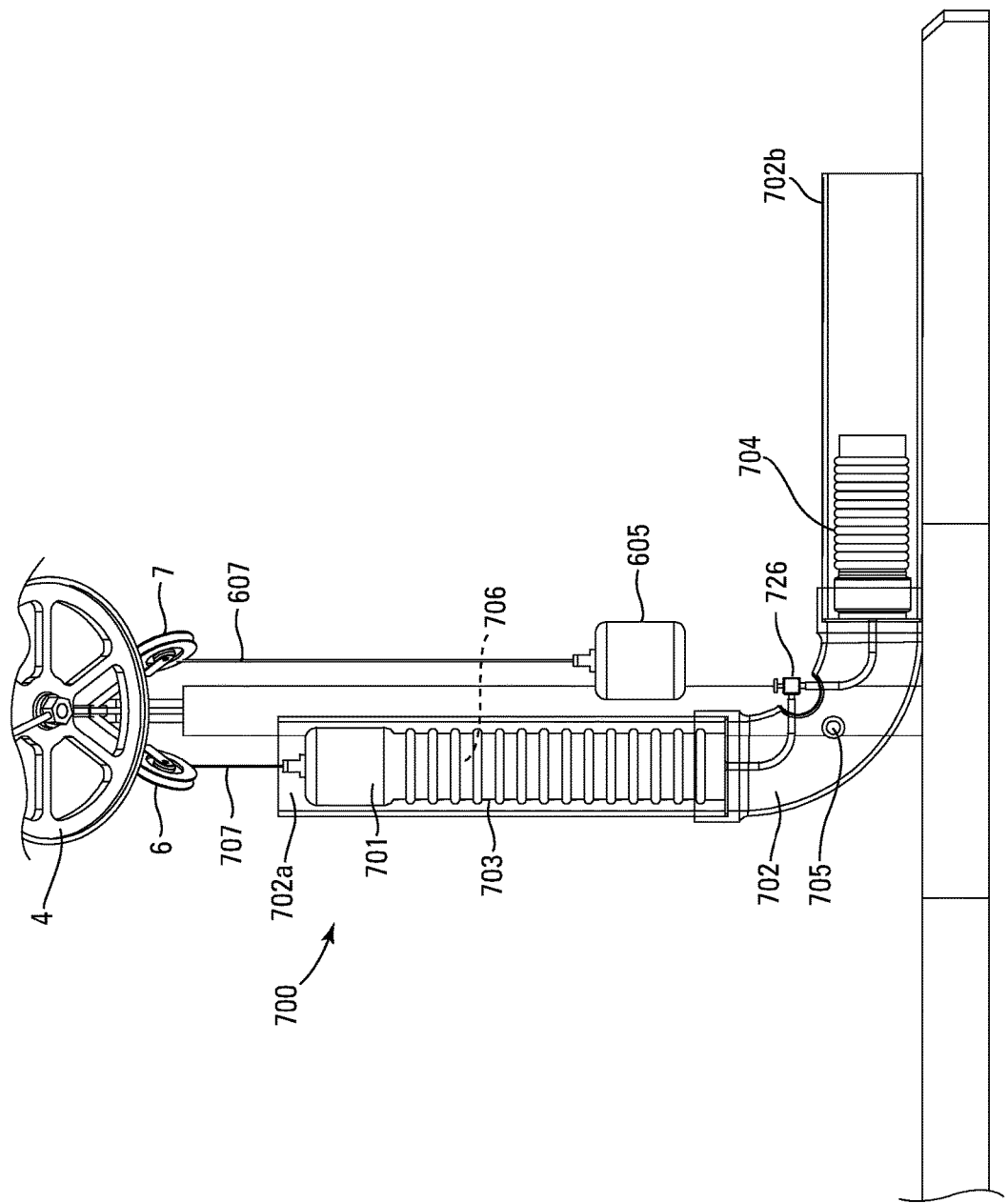
FIG. 13 is a side view of the bellows drive assembly of the embodiment shown in FIG. 12.

In another embodiment of the device 750, rotation of the carriage 12 and its attachments are controlled by a bellows drive assembly 700 as best shown in FIGS. 12-13. A main weight wire rope 707 attaches to the main weight 701 and runs over a top left pulley 6 and is affixed to the primary sheave 4. A counterweight wire rope 607 attaches to a counterweight 605 and runs over the right top pulley 7 and is affixed to the primary sheave 4. As in other embodiments, the primary sheave 4 is configured to rotate with the carriage 712. The carriage 712 further defines a first end 712a and a second end 712b. A support frame 702 houses a left bellows 703 and a right bellows 704 and both are connected to a valve 726. The support frame 702 is rotatably mounted on a pivot mount 705 and defines a support frame left end 702a and a support frame 702b. The left bellows 703 is housed in the support frame left end 702a and the right bellows 704 is housed in the support frame right end 702b. Following opening and proper adjustment of the valve 26 the main weight 701 begins descending, resulting in the rotation of the carriage 12 to follow the sun at the rate of approximately fifteen degrees per hour. During operation the support frame left end 702a, which contains the left bellows 703, is maintained in a vertical position. The fluid 603 during rotation is transferred from the left bellows 703 through the valve 26 to the right bellows 704.

Operation

Using the device 750, assuming all other necessary adjustments are made to the device 750, to operate the bellows 700, the support frame left end 702a is positioned vertically with the left bellows filled with fluid 603 while the support frame right end 702b is positioned horizontally with the right bellows 704 empty of inside fluid 706.

The main weight 701 is placed inside the support frame left end 702a and is supported by and pushes down on the left bellows 703 forcing the inside fluid 706 through the valve 26 and into the right bellows 704. With the valve properly adjusted the main weight 701 will follow the collapsing left bellows 703 and apply bias through the main weight wire rope 707 to the primary sheave 4 and rotate the carriage 12 to follow the apparent movement of the sun. Following operating the device 750, the valve 26 is kept open and the support frame left end 702a is positioned to be in a horizontal position (and the support frame right end 702b automatically repositioned in a vertical position). Gravity thus causes the fluid 603 to flow in the opposite direction, from the right bellows 704 through the valve 26 to the left bellows, to ready the device for the next operation.

To use the drive again, remove the main weight 701, rotate the support frame 702 and re-insert the main weight 701 into the support frame left end 702a.

Post-Operation

When the upper cylinder rod 24a is fully depressed the block hose clamp 28 is removed from the block 27. The weights 31a, 31b are lifted off the upper cylinder rod 24a and set aside. The hydraulic cylinder 24 is removed, rotated 180 degrees and set back into the fork mounts 36a, 36b. The weights 31a, 31b and threaded block hose clamp 28 is then re-attached and once movement begins, both seasonal turnbuckle 10 and cable-repositioning rotational adjustments are made as necessary. If subsequent use of the device 100 is desired the same day, only the rotational adjustment is necessary for tracking.

Regarding the electrically powered embodiments 200, 300 the device is repositioned as necessary and reenergized to repeat the process.

FIG. 6 is a side view of another embodiment of the invention 300 having gauges 202a, 207, 211 used to align the device in another embodiment where the demonstration model may be fitted with various solar collecting/concentrating elements and energy/light analyzing devices. In this embodiment, adjustment of the device 300 can be made by observation or by calculation. When made by observation the 24-hour timer motor 208 must be adjusted to local solar time, the latitude angle is set using the latitude adjustment sight 206. Fitted with an appropriately sized Fresnel lens 42 or other solar energy collecting element 16 with the 24-hour timer motor 208 rotating the polar-aligned shaft 203 at 15 degrees per hour, the solar elevation turnbuckle 210 and the rotational adjustment twist lock 207 are adjusted to place the Fresnel lens 42 focal point on a targeted surface supported by the carriage rack 212. Once adjusted, readings can be made at the latitude gauge 202a to learn the local latitude, at the rotational adjustment gauge 207 to learn the current position along the equation of time and the solar elevation gauge 211 to learn the current solar elevation between the winter and summer solstice's. This can also be adjusted by calculation, use astronomical data to set each of the gauged variable adjustments: local solar time, local latitude, equation of time and solar elevation angle.

Regarding the embodiment of the device 750, following operation of the device, with the valve 26 open, the support frame 702 is pivoted ninety degrees, causing the left bellows 703, contained within support frame left end 702a, which is now substantially drained of inside fluid 706, to a horizontal configuration. The main weight 701 is removed from atop the left bellows 703 and placed on the top end of the right bellows 704. The right bellows 704, contained within support frame right end 702b, which contains the transferred inside fluid 706, is put into a vertical configuration, resulting in the inside fluid 706 to be transferred 704 from the right bellows to the left bellows 703 to be prepared for another operation.

What is claimed is:

1. A solar tracking and energy collecting device, comprising:
    (a) a stand;
    (b) a polar alignable shaft rotatably mounted to the stand and a primary sheave fixedly mounted to the polar alignable shaft so the polar alignable shaft and primary sheave rotate together;
    (c) a carriage defining a first end and a second end mounted to the polar alignable shaft;
    (e) a solar energy collecting element attached to the first end or the second end of the carriage to focus the sun's rays, with a target attachment at the first end or the second end of the carriage;
    (f) an insulated vessel located at the first end or second end of the carriage for storing solar radiation;
    (g) a solar elevation adjustable support mechanism for adjusting the angle of the carriage with relation to the sun;
    (h) a left top pulley, and a right top pulley both attached to the stand;
    (i) a floating weight attached to a floating weight line, the line threaded over the left top pulley and affixed to the primary sheave, the floating weight suspended in a fluid inside a cylinder vessel;
    (j) a counterweight attached to a counterweight wire rope over the top right pulley and affixed to the primary sheave;
    (k) a fluid drip assembly affixed to the floating weight and contained in the cylinder vessel, the fluid drip assembly including a valve intake, a valve, a drip chamber, and a breather hose;
    (l) a drain hose attached to the drip chamber allowing the fluid to drain into a collection bladder;
    wherein when the valve is opened and properly adjusted, the fluid drains through the fluid drip assembly in a controlled manner, through the drain hose into the collection bladder, with the floating weight descending at the same rate as the fluid, thus applying a bias to the attached line, transferring energy to the primary sheave, causing the attached carriage to rotate.

2. The solar tracking and energy collecting device of claim 1 wherein the solar energy collecting element is a Fresnel lens.

3. The solar tracking and energy collecting device of claim 1 wherein the solar energy collecting element is a photovoltaic cell.

4. The solar tracking and energy collecting device of claim 1 wherein the target attachment is a swivel pot.

5. The solar tracking and energy collecting device of claim 1 wherein the target attachment is an oven.

6. The solar tracking and energy collecting device of claim 1 wherein the target attachment is a latent energy storage device.

7. A method of using a solar tracking and energy collecting device, comprising the steps of:
    (a) aligning permanently a polar alignable shaft with the North star to align the polar alignable shaft with the Earth's axis;
    (b) filling a cylinder vessel with a fluid, causing a floating weight inside the cylinder vessel to rise in the cylinder vessel while the counterweight applies bias and rotates the primary sheave and attached carriage clockwise;
    (c) adjusting the seasonally changing elevation of the carriage, using a solar elevation turnbuckle to position the solar energy collecting elements attached to the carriage to be perpendicular to the sun's rays;
    (d) opening and adjusting a valve fitted to a fluid drip assembly within the cylinder vessel, which is affixed to the floating weight, allowing the fluid to drain from the cylinder vessel in a controlled manner, thereby applying a bias to the floating wire rope, causing the primary sheave and carriage to rotate at a rate to track the sun across the sky; and
    (e) adjusting the rotational position of the carriage to position the solar energy collecting elements attached to the carriage to be perpendicular to the sun's rays by uncoupling the carriage from the primary sheave and independently rotating the carriage and then recoupling the carriage to the primary sheave when the carriage is correctly positioned.

8. A solar tracking and energy collecting device, comprising:
    (a) a stand;
    (b) a polar alignable shaft rotatably mounted to the stand and a primary sheave fixedly mounted to the polar alignable shaft so the polar alignable shaft and primary sheave rotate together;
    (c) a carriage defining a first end and a second end mounted to the polar alignable shaft;
    (e) a solar energy collecting element attached to the first end or the second end of the carriage to focus the sun's rays, with a target attachment at the first end or the second end of the carriage;
    (f) an insulated vessel located at the first end or second end of the carriage for storing solar radiation;
    (g) a solar elevation adjustable support mechanism for adjusting the angle of the carriage with relation to the sun;
    (h) a left top pulley, and a right top pulley both attached to the stand;
    (i) a main weight attached to a main weight line, atop a left bellows, the line threaded over the left top pulley and affixed to the primary sheave, the main weight suspended by an inside fluid inside the left bellows housed within a support frame, a right bellows housed within the support frame, the right bellows in fluid communication with the left bellows, the support frame defining a support frame left end and a support frame right end, housed within the support frame, the support frame rotatably mounted to the stand by a pivot mount;

(j) a counterweight attached to a counterweight line threaded over the top right pulley and affixed to the primary sheave;

(k) a valve between the left bellows and the right bellows; wherein when the valve is opened and properly adjusted, the inside fluid drains through the valve into the right bellows, with the main weight descending at the same rate as the fluid, thus applying a bias to the attached line, transferring energy to the primary sheave, causing the attached carriage to rotate.

9. The solar tracking and energy collecting device of claim 8 wherein the support frame left end of the support frame is in a vertical position during operation and the support frame right end of the support frame is in a horizontal position, allowing the inside fluid to transfer from the left bellows to the right bellows.

10. The solar tracking and energy collecting device of claim 8 wherein following operation, with the valve open, the support frame is pivoted to place the support frame right end in a vertical position and the support frame left end is in a horizontal position, resulting in the transfer of the inside fluid back to the left bellows.

11. The solar tracking and energy collecting device of claim 8 wherein the solar energy collecting element is a Fresnel lens.

12. The solar tracking and energy collecting device of claim 8 wherein the solar energy collecting element is a photovoltaic cell.

13. The solar tracking and energy collecting device of claim 8 wherein the target attachment is a swivel pot.

14. The solar tracking and energy collecting device of claim 8 wherein the target attachment is an oven.

15. The solar tracking and energy collecting device of claim 8 wherein the target attachment is a latent energy storage device.

16. A method of using a solar tracking and energy collecting device, comprising the steps of:

(a) aligning permanently a polar alignable shaft with the North star to align the polar alignable shaft with the Earth's axis;

(b) setting a main weight attached to a main weight line, the line threaded over a left top pulley and affixed to a primary sheave, the main weight atop a left bellows;

(c) adjusting a valve so an inside fluid drains through the valve from a left bellows into a right bellows, with the main weight descending at the same rate as the fluid, thus applying a bias to the main weight line, transferring energy to the primary sheave, causing a carriage attached to the polar alignable shaft to rotate;

(d) adjusting the rotational position of the carriage to position a solar energy collecting element attached to the carriage to perpendicular to the sun's rays by uncoupling the carriage from the primary sheave and independently rotating the carriage and then recoupling the carriage to the primary sheave when the carriage is correctly positioned.

17. The method of claim 16, further comprising:

(a) following operating the device, maintaining the valve open; and (b) removing the main weight from atop a left empty bellows inside a support frame left side and pivoting a pivotable support frame counter clockwise, then placing the main weight atop a full right bellows inside a support frame right side, resulting in fluid being transferred from the right bellows through the valve into the left bellows.

* * * * *